United States Patent [19]
Apps et al.

[11] Patent Number: 5,967,322
[45] Date of Patent: *Oct. 19, 1999

[54] CONTAINER ASSEMBLY WITH TAMPER EVIDENT SEAL

[75] Inventors: William P. Apps, Alpharetta, Ga.; John A. Hagan, Valley Forge, Pa.

[73] Assignee: Rehrig Pacific Company, Inc., Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/382,643

[22] Filed: Feb. 2, 1995

[51] Int. Cl.$^6$ ................................................. B65D 43/04
[52] U.S. Cl. ......................... 206/497; 206/504; 222/105; 222/143; 222/183
[58] Field of Search ..................... 206/497, 504; 222/183, 105, 143

[56] References Cited

U.S. PATENT DOCUMENTS

| | | |
|---|---|---|
| D. 197,311 | 1/1964 | Spaak et al. . |
| D. 252,172 | 6/1979 | Carroll et al. . |
| D. 257,528 | 11/1980 | Cherry . |
| D. 320,298 | 9/1991 | Apps et al. . |
| D. 329,931 | 9/1992 | Apps . |
| D. 348,138 | 6/1994 | Lang-Ree et al. . |
| D. 348,342 | 6/1994 | Lang-Ree et al. . |
| D. 348,343 | 6/1994 | Lang-Ree et al. . |
| 2,347,980 | 5/1944 | Apfelbaum . |
| 3,126,120 | 3/1964 | Crate . |
| 3,232,491 | 2/1966 | Hunt ......................................... 222/183 |
| 3,265,254 | 8/1966 | Carter et al. . |
| 3,282,462 | 11/1966 | Box . |
| 3,295,714 | 1/1967 | Addario . |
| 3,343,719 | 9/1967 | Kastamo et al. ......................... 222/105 |
| 3,368,721 | 2/1968 | Wiskochil . |
| 3,371,824 | 3/1968 | Goss ......................................... 222/105 |
| 3,379,339 | 4/1968 | Asenbauer . |
| 3,421,656 | 1/1969 | Asenbauer . |
| 3,447,715 | 6/1969 | Beney . |
| 3,463,345 | 8/1969 | Bockenstette . |
| 3,568,879 | 3/1971 | Box . |
| 3,616,943 | 11/1971 | Brink . |
| 3,628,684 | 12/1971 | Sere . |
| 3,642,168 | 2/1972 | Wiley, Jr. et al. . |
| 3,759,416 | 9/1973 | Constantine . |
| 3,773,213 | 11/1973 | Fredrick . |
| 3,830,406 | 8/1974 | Robb . |
| 3,837,533 | 9/1974 | Splan . |
| 3,840,115 | 10/1974 | Ladewig . |
| 3,937,363 | 2/1976 | Anderson ................................ 222/105 |
| 3,940,018 | 2/1976 | Scholle . |
| 3,964,636 | 6/1976 | Rehrig . |
| 3,967,747 | 7/1976 | Wagner . |
| 3,998,327 | 12/1976 | Box . |
| 4,011,948 | 3/1977 | Rehrig et al. . |

(List continued on next page.)

FOREIGN PATENT DOCUMENTS

| | | |
|---|---|---|
| 1 089 786 | 11/1980 | Canada . |
| 435 584 | 10/1967 | Switzerland . |
| 2 141 778 | 1/1985 | United Kingdom . |
| 2 171 980 | 9/1986 | United Kingdom . |
| 2 204 023 | 11/1988 | United Kingdom . |

OTHER PUBLICATIONS

Karen A. Auguston, "Leading The Way In Parts Distribution", reprinted from *Modern Materials Handling*, Aug., 1989.

Rand Catalog, pp. 45–48, undated.

Lewisystems, "Polylewton Flipak", p. 26, undated.

Lewisystems Brochure, p. 10, undated.

Liqui–Box Corporation Catalog, H1E–1M, Undated.

*Primary Examiner*—Joseph M. Moy
*Attorney, Agent, or Firm*—Brooks & Kushman P.C.

[57] ABSTRACT

A reusable container assembly is provided which comprises a substantially rectangular open-top container particularly adapted to receive a fluid-containing bag. The container is lidded to thereby enclose the contents of the container assembly. A side wall aperture receives the spout of a fluid-containing bag disposed within the container assembly. The container assembly is further made tamper evident.

20 Claims, 17 Drawing Sheets

U.S. PATENT DOCUMENTS

| | | |
|---|---|---|
| 4,161,261 | 7/1979 | Frater . |
| 4,189,052 | 2/1980 | Carroll et al. . |
| 4,205,749 | 6/1980 | Carroll et al. . |
| 4,548,320 | 10/1985 | Box . |
| 4,557,406 | 12/1985 | Olinger et al. . |
| 4,620,644 | 11/1986 | Miller . |
| 4,645,122 | 2/1987 | Nederveld . |
| 4,685,567 | 8/1987 | Webb . |
| 4,688,675 | 8/1987 | Miller et al. . |
| 4,742,933 | 5/1988 | Panick . |
| 4,765,480 | 8/1988 | Malmanger . |
| 4,789,075 | 12/1988 | Sun . |
| 5,025,945 | 6/1991 | Lyon . |
| 5,029,734 | 7/1991 | Nichols . |
| 5,069,365 | 12/1991 | Woodhouse ............................... 222/105 |
| 5,163,587 | 11/1992 | Apps et al. . |
| 5,230,914 | 7/1993 | Akervik ................................. 220/497 |
| 5,330,069 | 7/1994 | Jamison et al. . |
| 5,335,820 | 8/1994 | Christianson . |
| 5,353,948 | 10/1994 | Lanoue et al. . |
| 5,462,168 | 10/1995 | Oberhelman et al. .................. 222/105 |

CONTAINER ASSEMBLY WITH TAMPER EVIDENT SEAL

BACKGROUND OF THE INVENTION

1. Field of the Invention

The present invention is directed to nestable and stackable container assemblies formed of molded plastic material, such as polyethylene, polypropylene, or the like, for use in storing and transporting goods. The invention is particularly directed to the transport and storage of a fluid-containing bag in a reusable container assembly. Such fluid-containing bags are commonly used to transport and store unstable bulk commodities such as, for example, beverage syrups or post mixes. In this regard, the present invention is directed to a lidded container assembly comprised of a substantially rectangular open-top container which may have a fluid-containing bag disposed therein. The container assembly of the present invention is provided with a means for evidencing tampering with the contents thereof.

2. Description of the Prior Art

U.S. Pat. No. 5,163,587, the disclosure of which is hereby incorporated by reference, describes a reusable container particularly adapted for use in a beverage syrup delivery system. The container comprises an open-top body that is formed, for example, of high-density polyethylene and is adapted to receive a fluid-containing bag. The container is capable of both stacking and nesting. In order to accommodate exposure of a spout attached to the fluid-containing bag, the container, preferably on one end wall, is provided with an opening designed to permit release of the spout from the container. The container is further provided with a means for fixing the spout to the container for ready access when the fluid in the bag is to be discharged.

The container of U.S. Pat. No. 5,163,587, although constituting a significant improvement over comparable boxes or containers of the prior art, suffers from certain drawbacks. Initially, because the container is open-topped, it is susceptible to tampering with the contents therein, and the fluid-containing bags are exposed to possible damage during storage or shipment. Additionally, the fluid-like nature of the bags gives them a tendency to migrate out of the boxes while traversing conveyors along steep inclines.

SUMMARY OF THE INVENTION

In accordance with the present invention, a novel lidded container assembly with a tamper evident seal is herein provided. The container assembly comprises a bottom surface, a first pair of opposed side walls integrally joined with the bottom surface and extending upwardly away therefrom, and a second pair of opposed side walls integrally joined with the bottom surface and extending upwardly away therefrom. The first and second pairs of opposed side walls are integrally joined with each other along common end surfaces thereof to form with the bottom surface a substantially rectangular open-top container. The uppermost surfaces of the first and second pairs of opposed side walls collectively form an upper container rim.

In a first embodiment of the present invention, a container lid having an outer periphery is provided. The container lid is hingedly connected to a first side wall of the first pair of opposed side walls, and is designed to protect the contents of the container assembly from damage. The container lid includes a raised surface extending about its outer periphery, with the raised surface forming a hollow undersurface about the outer periphery of the container lid. The hollow undersurface of the container lid is adapted to be received along the upper container rim to thereby form an exposed seam between the container lid and the open-top container.

A side wall aperture is also provided in this first embodiment. The side wall aperture is formed in a first side wall of the second pair of opposed side walls, and may be formed by a recess extending downwardly from the uppermost surface of the first side wall.

Finally, a tamper-evident sealing means is provided to evidence tampering with the contents of the container assembly. The tamper-evident sealing means may be any conventional type, such as a shrink wrap film or adhesive-bearing material. The tamper-evident sealing means may extend across the side wall aperture to enclose the contents of the container. The tamper evident sealing means may also extend along at least a portion of the exposed seam between the container lid and the open-top container when the hollow undersurface of the container lid is received along the upper container rim. Stated differently, the tamper-evident sealing means effectively seals the container when the lid is in the closed position. By observing the condition of the tamper-evident sealing means, the end user is thus capable of determining whether the contents of the container assembly may have been tampered with or damaged during transport or storage.

The container lid is connected to the first side wall with a telescoping hinge means. The telescoping hinge means may comprise a plurality of container hinge elements disposed in spaced relation along the uppermost surface of the first side wall. Each container hinge element may comprise a pivot pin slidably received within a respective hinge aperture disposed in the first side wall. Because of its unique configuration, the telescoping hinge means is capable of movement both parallel to and perpendicular to the first side wall. In this manner, when the hinge telescopes upwardly, the lid may be rotated up and away from the top of the container. Thus, the lid is capable of being rotated around and juxtaposed with the first side wall such that the lid lies flat.

The container assembly of the present invention is capable of both stacking and nesting. The bottom surface of the container assembly includes an aperture. This bottom surface aperture is adapted to receive the raised surfaces of the container lids of a pair of similarly shaped juxtaposed container assemblies when the container assemblies are disposed in a cross-wise stacked configuration. In addition, the interior and exterior surfaces of the first and second pairs of opposed side walls are formed with alternating recesses and projections configured and sized for reception by the recesses of the projections of a similarly shaped adjacent container assembly when the container assemblies are disposed in a nested configuration.

The container assembly of the present invention is particularly adapted for use with a fluid-containing bag which may be disposed within the substantially rectangular open-top container. The fluid-containing bag may include a spout, and the side wall aperture is adapted to receive such a spout. More particularly, the side wall aperture terminates in a recessed surface of the first side wall, and this recessed surface is configured to receive the spout. When the container assembly reaches its final destination, the user may simply retrieve the spout from within the open-top container and lock the spout into position in the aperture along the side wall.

A second embodiment of the container assembly of the present invention includes a substantially rectangular open-top container as described above in accordance with the first embodiment. With this embodiment, however, a split-lid configuration is utilized. More particularly, a first container lid having an outer periphery is provided. The first container lid is hingedly connected to a first side wall of the first pair of opposed side walls. The first container lid includes a projecting portion extending along one side of its outer periphery. The first container lid further includes a raised surface extending about its outer periphery, with the raised surface forming a hollow undersurface about the outer periphery. The hollow undersurface of the first container lid is adapted to be received along a portion of the upper container rim to thereby form a first exposed seam between the first container lid and the open-top container.

A second container lid having an outer periphery is also provided in accordance with this second embodiment of the present invention. Like the first container lid, the second container lid is hingedly connected to a second side wall of the first pair of opposed side walls. Also similarly, the second container lid includes a projecting portion extending along one side of its outer periphery. The second container lid further includes a raised surface extending about its outer periphery, with the raised surface forming a hollow undersurface about the outer periphery. Again, the hollow undersurface of the second container lid is adapted to be received along a portion of the upper container rim to thereby form a second exposed seam between the second container lid and the open-top container.

The first and second container lids are connected to the respective first or second side walls with a telescoping hinge means in accordance with the description of the first embodiment above. Accordingly, the first and second container lids may be rotated up and away from the top of the container and juxtaposed with the respective first or second side wall such that the lids lie flat.

The projecting portions of the first and second container lids are capable of being moved into an interlocking configuration with one another when the hollow undersurfaces of the container lids are received along the upper container rim, i.e., when the container lids are in their closed positions. The interlocking configuration of the projecting portions thereby forms a raised interlocking surface and a third exposed seam between the first and second container lids.

The second embodiment of the container system of the present invention also includes a side wall aperture formed in the first side wall of the second pair of opposed side walls. This side wall aperture is formed substantially in accordance with the side wall aperture discussed above with respect to the first embodiment. Thus, the side wall aperture may be formed by a recess extending downwardly from the uppermost surface of the first side wall. In this embodiment, a second side wall of the second pair of opposed side walls also includes a recess extending downwardly from the uppermost surface thereof. This recess in the second side wall is adapted to receive the projecting portions of the first and second container lids when the lids are moved into their closed positions.

Finally, a tamper-evident sealing means, such as a shrink wrap film or adhesive-bearing material, may be provided in this second embodiment. The tamper-evident sealing means may extend across the side wall aperture to thereby effectively enclose the contents of the container system. The tamper-evident sealing means may further extend along the third exposed seam and across the recess in the second side wall. The tamper-evident sealing means may also extend along at least a portion of the first and second exposed seams when the hollow undersurfaces of the container lids are received along the upper container rim, i.e., when the lids are in their closed positions. As with the first embodiment, the tamper-evident sealing means enables the ultimate user to determine whether the contents of the container assembly may have been tampered with or damaged.

The container assembly of this second embodiment of the present invention is also capable of stacking or nesting. In this regard, the bottom surface of the container assembly includes first and second apertures. These first and second bottom surface apertures are adapted to receive the raised surfaces of the first and second container lids of a pair of similarly shaped juxtaposed container assemblies when the container assemblies are disposed in a cross-wise stacked configuration. More particularly, the first and second apertures are designed to receive the peripheral raised surfaces and the raised interlocking surfaces formed along the top of a pair of adjacent container assemblies stacked cross-wise therebelow. Like the first embodiment, the container assembly of the second embodiment of the present invention is also nestable. The interior and exterior surfaces of the first and second pairs of opposed side walls are formed with alternating recesses and projections configured and sized for reception by the recesses of the projections of an adjacent similarly shaped container assembly when the container assemblies are disposed in a nested configuration.

Like the first embodiment, the container assembly of the second embodiment is also particularly adapted for use with a fluid-containing bag with a spout which may be disposed within the substantially rectangular open-top container. Again, the side wall aperture may be formed by a recessed surface of the first side wall such that recessed surface is configured to receive the spout. The user may retrieve the spout from within the open-top container and lock the spout into position along the side wall when it is desired to withdraw the contents.

A third embodiment of the container assembly of the present invention similarly utilizes a substantially rectangular open-top container formed in accordance with the description of the first and second embodiments above. However, this embodiment utilizes a modified split-lid configuration in cooperation with a recessed aperture formed along one side of the container assembly to effectively house a fluid-containing bag with a spout.

In particular, a fluid-containing bag with a spout may be disposed within the substantially rectangular open-top container. An aperture is formed in a first side wall of the second pair of opposed side walls. This side wall aperture is formed by a recess extending downwardly from the uppermost surface of the first side wall. The side wall aperture terminates in a recessed surface of the first side wall, with the recessed surface configured to receive the spout. Also, a recess is formed in the second side wall of the second pair of opposed side walls to receive the projecting portions of the first and second container lids when the lids are in their closed positions. The container assembly of this third embodiment of the present invention is also capable of stacking or nesting in accordance with the description above of the second embodiment.

The first and second container lids of the third embodiment are provided substantially in accordance with the first and second container lids described above with respect to the second embodiment. Specifically, these hingedly-connected lids include raised surfaces extending about their outer peripheries, and further include respective projecting portions which provide for an interlocking configuration and the formation of a raised interlocking surface and third exposed seam. In addition, however, each of these first and second container lids further includes a recessed area about a portion of its respective outer periphery. These respective recessed areas are configured to correspond to the side wall aperture and provide clearance for the exposed spout.

With this third embodiment, the spout extends from the container and may be sealed such that it is tamper evident. In this regard, the spout may be provided with a conventional cap which is tamper evident. This cap may also include informational indicia regarding the particular contents of the container system.

Additionally, or in the alternative, the container assembly may further comprise a tamper-evident sealing means, such as a shrink wrap film or adhesive-bearing material. This tamper-evident sealing means may extend across the side wall aperture and the recessed areas of the first and second container lids to thereby cover the exposed spout. The tamper-evident sealing means may further extend along the third exposed seam. The tamper-evident sealing means may also extend along the first and second exposed seams and across the recess in the second side wall when the lids are in their respective closed positions. Again, the tamper-evident sealing means is designed to provide evidence of possible tampering with or damage to the contents of the container assembly.

While the first and second embodiments of the container assembly of the present invention are designed for storage and transport with a fluid-containing bag disposed entirely within the open-top container, this third embodiment allows for the storage and transport of a fluid-containing bag in a ready-to-use condition. The unique configuration of this third embodiment allows shipping of the container assembly with the spout in its operative position. The spout is disposed within the side wall aperture and received along the recessed surface of the side wall such that it is exposed from the open-top container. With the container lids in their closed positions, the side wall and the lids cooperate to secure the spout in place, and ensure that access to the interior of the container assembly is prevented. The exposed spout is made tamper-evident in a conventional manner as discussed above, such as by the inclusion of a tamper-evident cap. In addition, or in the alternative, a separate tamper-evident sealing means may be used to protect the cap during transport and storage.

Because the fluid-containing bag may be shipped in the container assembly in a ready-to-use condition, handling by the end user is desirably reduced. When the container assembly reaches its final destination, the user simply accesses the spout by removing the cap and/or breaking the tamper-evident sealing means. The user need not retrieve the spout from within the open-top container or secure it in place. Rather, it is likely that the apparatus used to fill the fluid-containing bag may be used to secure the spout into its operative position along the side wall when the container assembly is readied for transport.

Other objects and advantages of the present invention will become readily apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Figure 1:
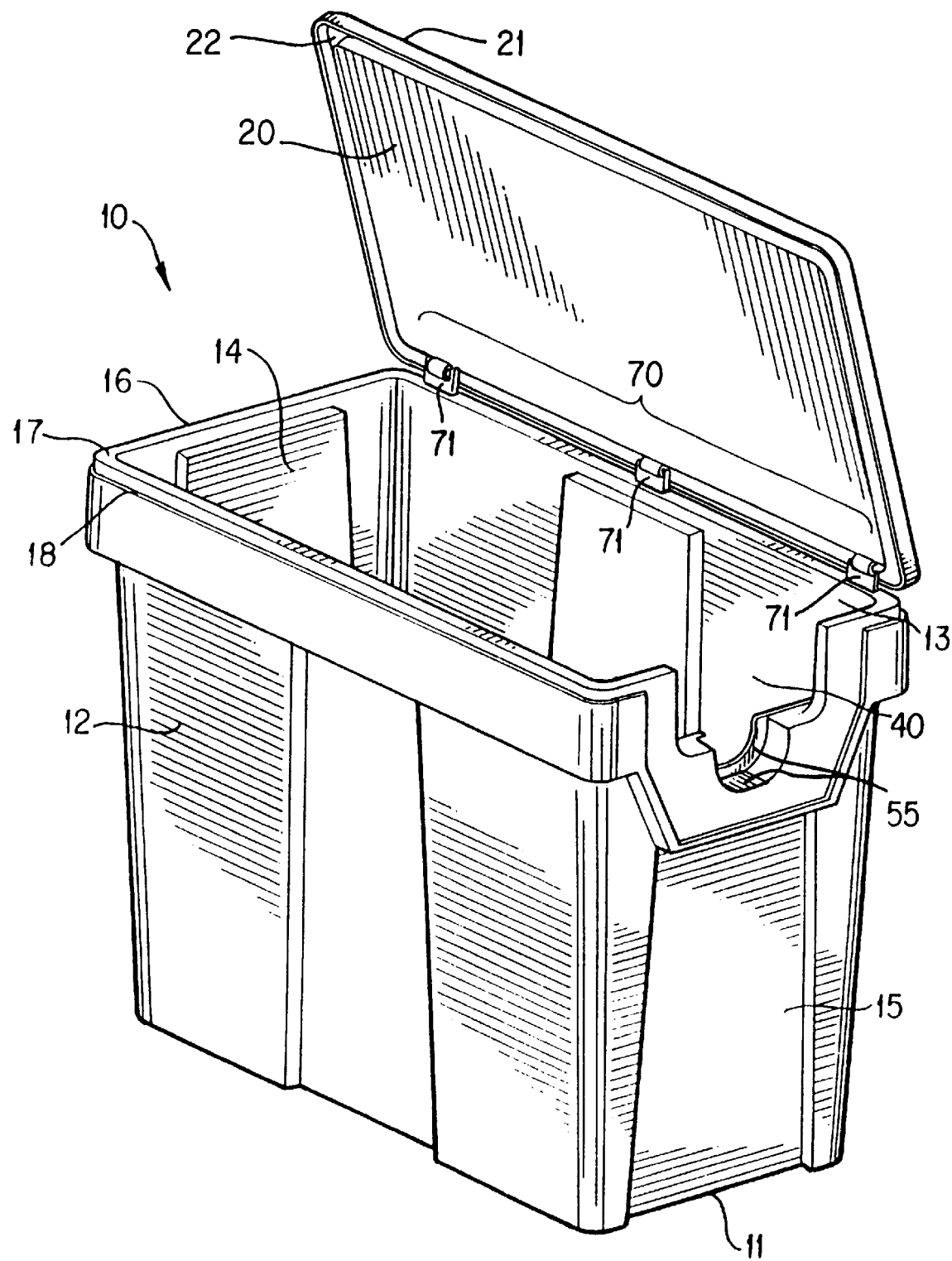
FIG. 1 is a perspective view of a first embodiment of the container assembly of the present invention in an open condition.

Referring to the drawings, a first embodiment of the container assembly of the present invention is shown generally at 10 in FIGS. 1–7. The container assembly 10 is formed from a molded plastic material, such as polyethylene, polypropylene, or the like, such that it is sturdy and reusable. The container assembly 10 comprises a bottom surface 11, a first pair of opposed side walls 12, 13 integrally joined with the bottom surface 11 and extending upwardly away therefrom, and a second pair of opposed side walls 14, 15 integrally joined with the bottom surface 11 and extending upwardly away therefrom. As shown in FIG. 1, the first and second pairs of opposed side walls 12, 13, 14, 15 are integrally joined with each other along common end surfaces thereof to form with the bottom surface 11 a substantially rectangular open-top container. The uppermost surfaces of the first and second pairs of opposed side walls 12, 13, 14, 15 collectively form an upper container rim 16 about the periphery of the container. The upper container rim 16 includes an upstanding surface 17 and a thin shelf 18 disposed on the outside of the container.

Figure 2:
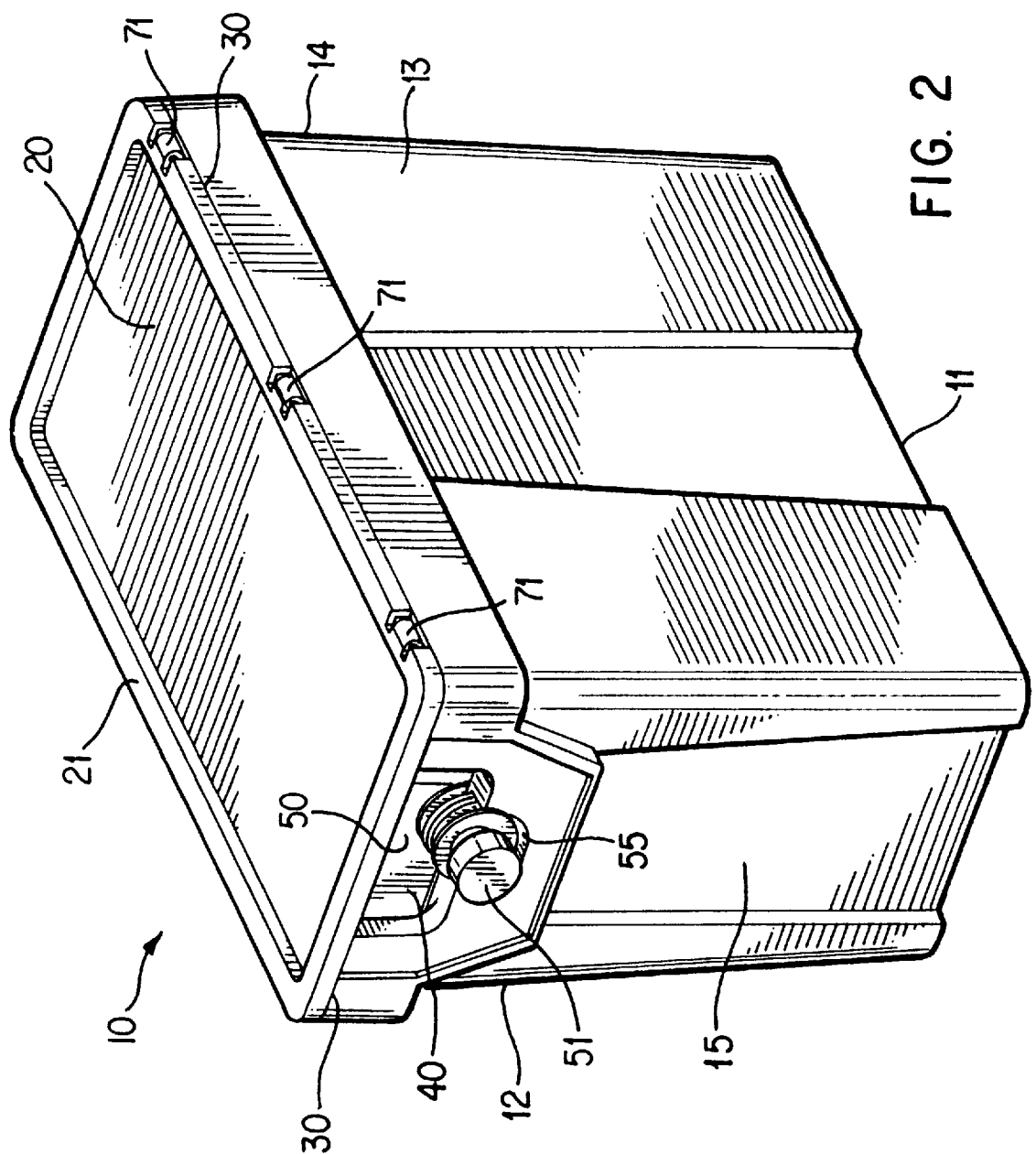
FIG. 2 is a perspective view of the container assembly of FIG. 1 shown in a closed condition.

In this first embodiment of the present invention, a container lid 20 having an outer periphery is provided. The container lid 20 is hingedly connected to a first side wall 13 of the first pair of opposed side walls. The container lid 20 includes a raised surface 21 extending about its outer periphery, with the raised surface 21 forming a hollow undersurface 22 about the outer periphery of the container lid 20. The hollow undersurface 22 of the container lid 20 is adapted to be received along the upper container rim 16 to thereby form an exposed seam 30 between the container lid 20 and the open-top container. More specifically, when the lid 20 is moved to a closed position as shown in FIG. 2, the hollow undersurface 22 is received along the upstanding surface 17 of the upper container rim 16 with the lowermost edge of the lid 20 resting on the thin shelf 18. The lid 20 is thus securely snap-fit onto the side walls 12, 13, 14, 15 of the open-top container.

A side wall aperture 40 is also provided in the container assembly 10. The side wall aperture 40 is formed in a first side wall 15 of the second pair of opposed side walls. As shown most clearly in FIGS. 1 and 3–4, this side wall aperture 40 may be formed by a recess extending downwardly from the uppermost surface of the first side wall 15.

Figure 7:
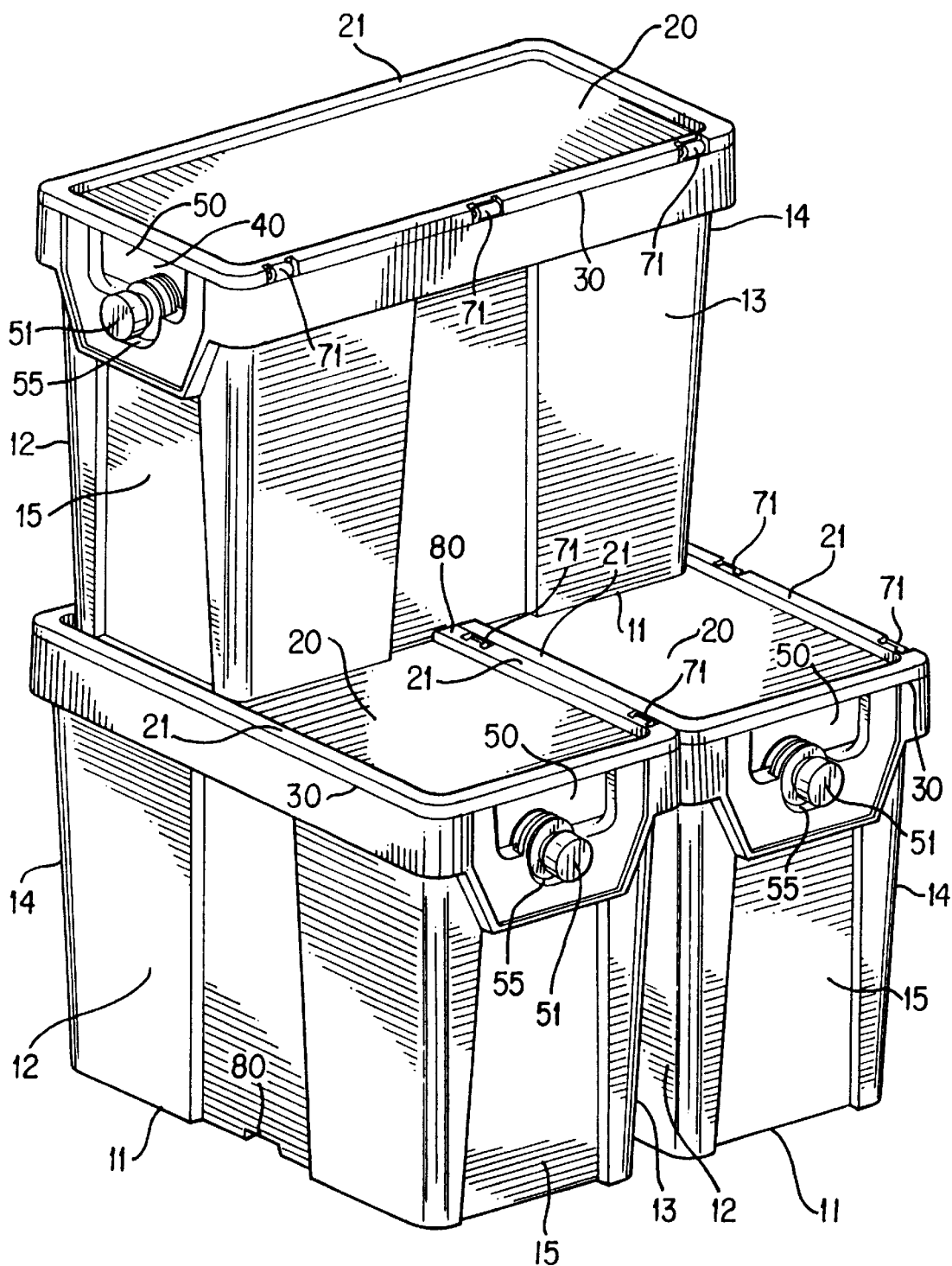
FIG. 7 is a perspective view of a stacked configuration of several of the container assemblies shown in FIG. 1.

The container assembly 10 is particularly designed for use with a fluid-containing bag 50 as shown in FIGS. 2 and 7. Such fluid-containing bags 50 are used to store and transport, for example, beverage syrup. The fluid-containing bag 50 may be disposed entirely within the substantially rectangular open-top container for storage and transport. With the lid 20 closed, the fluid-containing bag 50 will not be damaged. When a user wishes to withdraw the contents of the fluid-containing bag 50, a spout 51 formed at one end of the bag 50 is used. The user retrieves the spout 51 from within the container and locates it in the area of the side wall aperture 40. With the spout 51 exposed, the fluid-containing bag 50 may be drained. The side wall aperture 40 of the container assembly is thus adapted to receive the spout 51. More particularly, the side wall aperture 40 terminates in a recessed surface 55 of the first side wall 15, and this recessed surface 55 is configured to receive the spout 51 as shown in FIG. 2. While the side wall aperture 40 may be disposed at any location along the side wall 15, it is preferably formed by a recess extending downwardly from the uppermost surface of the side wall 15 as shown most clearly in FIGS. 1 and 3–4. A dip tube may be used to discharge the fluid from the bag 50 at this elevated position along the side wall 15.

Figure 5:
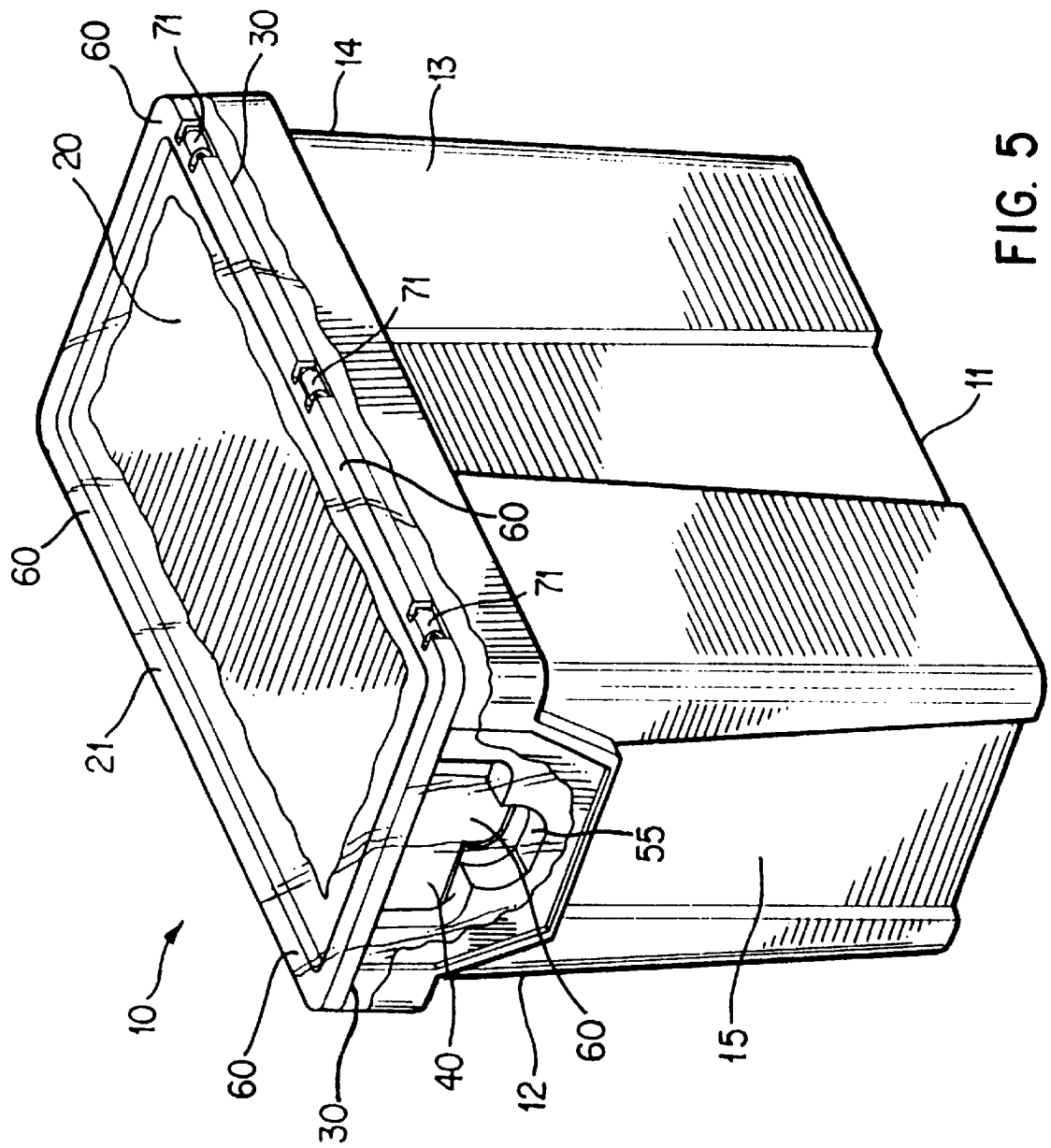
FIG. 5 is a perspective view of the container assembly of FIG. 1 shown in a closed condition and including a tamper-evident sealing means.

The container assembly 10 of the present invention is further provided with a tamper-evident seal. In this regard, as shown in FIG. 5, the container assembly 10 is provided with a tamper-evident sealing means 60. This tamper-evident sealing means 60 enables the user to detect tampering with the contents of the container assembly 10 during storage or transport. The container assembly 10 is first loaded with the desired contents, e.g., the fluid-containing bag 50 shown in FIGS. 2 and 7. With the lid 20 of the container assembly 10 in a closed position, a tamper-evident sealing means 60 may be added which extends across the side wall aperture 40 to fully enclose the contents of the container. The tamper-evident sealing means 60 may also extend along the exposed seam 30 between the container lid 20 and the open-top container. The tamper-evident sealing means 60 thus effectively seals the entire container assembly 10 in a closed position. When the container assembly later reaches its destination, if the tamper-evident sealing means 60 has been broken, this indicates to the user that the contents may have been tampered with or damaged. If the tamper-evident sealing means 60 is unbroken, the user may then personally break the tamper-evident sealing means 60 and access the contents disposed therein, e.g., the spout 51 of the fluid-containing bag 50 as shown in FIGS. 2 and 7.

The tamper-evident sealing means 60 may be any conventional type known to those having skill in the art, such as a shrink wrap film or adhesive-bearing material. A label or sticker providing information regarding the contents of the container assembly may also be used to cover the side wall aperture 40. While the sealing means 60 is illustrated in FIG. 5 as extending across the side wall aperture 40 and fully along the exposed seam 30, this configuration is not absolutely required. Rather, it is within the scope of the present invention to utilize the sealing means 60 only along that portion of the exposed seam 30 which is necessary to ensure that tampering with the container assembly 10 may be detected.

Figure 3:
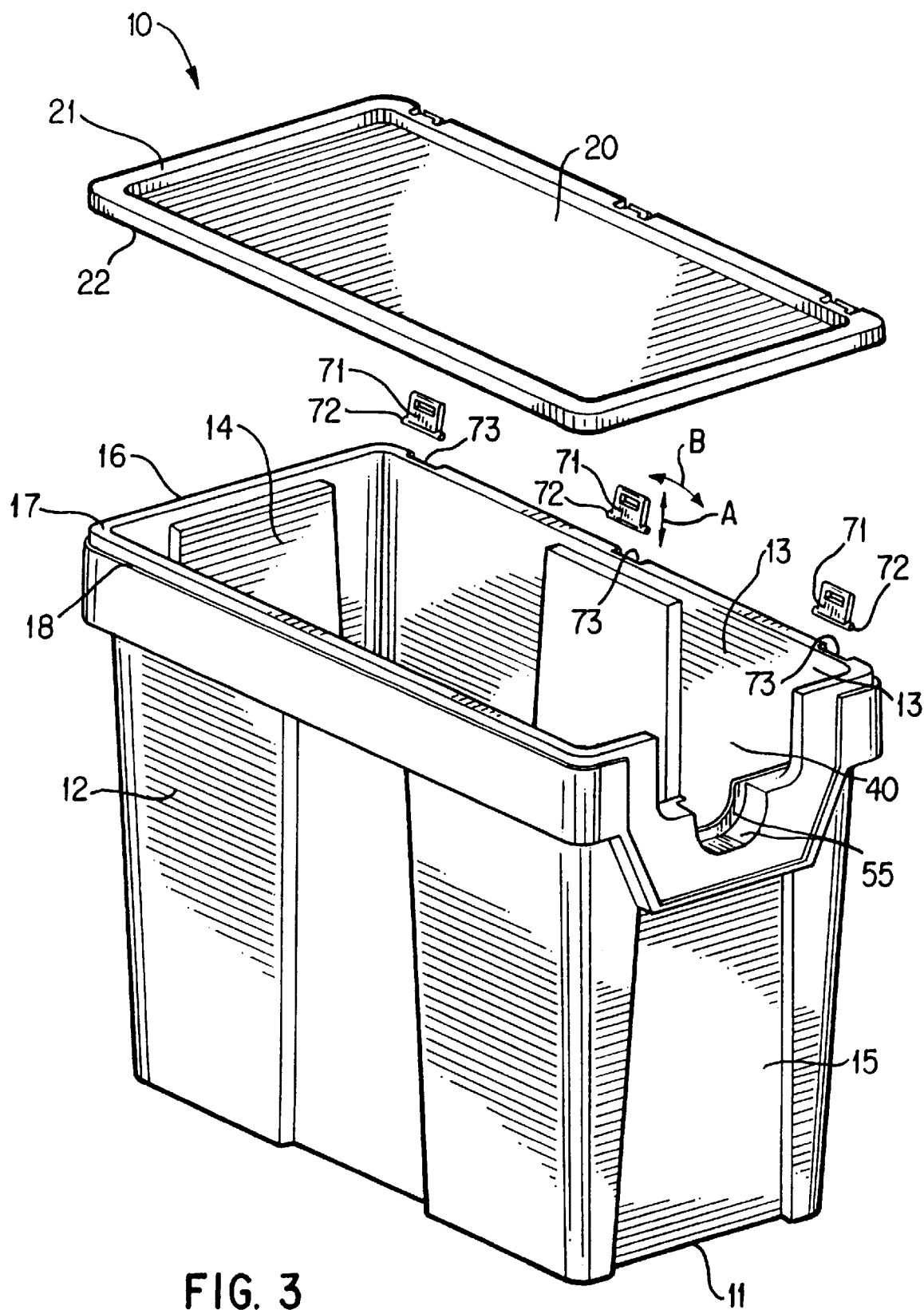
FIG. 3 is a partially exploded perspective view of the container assembly of FIG. 1.
Figure 4:
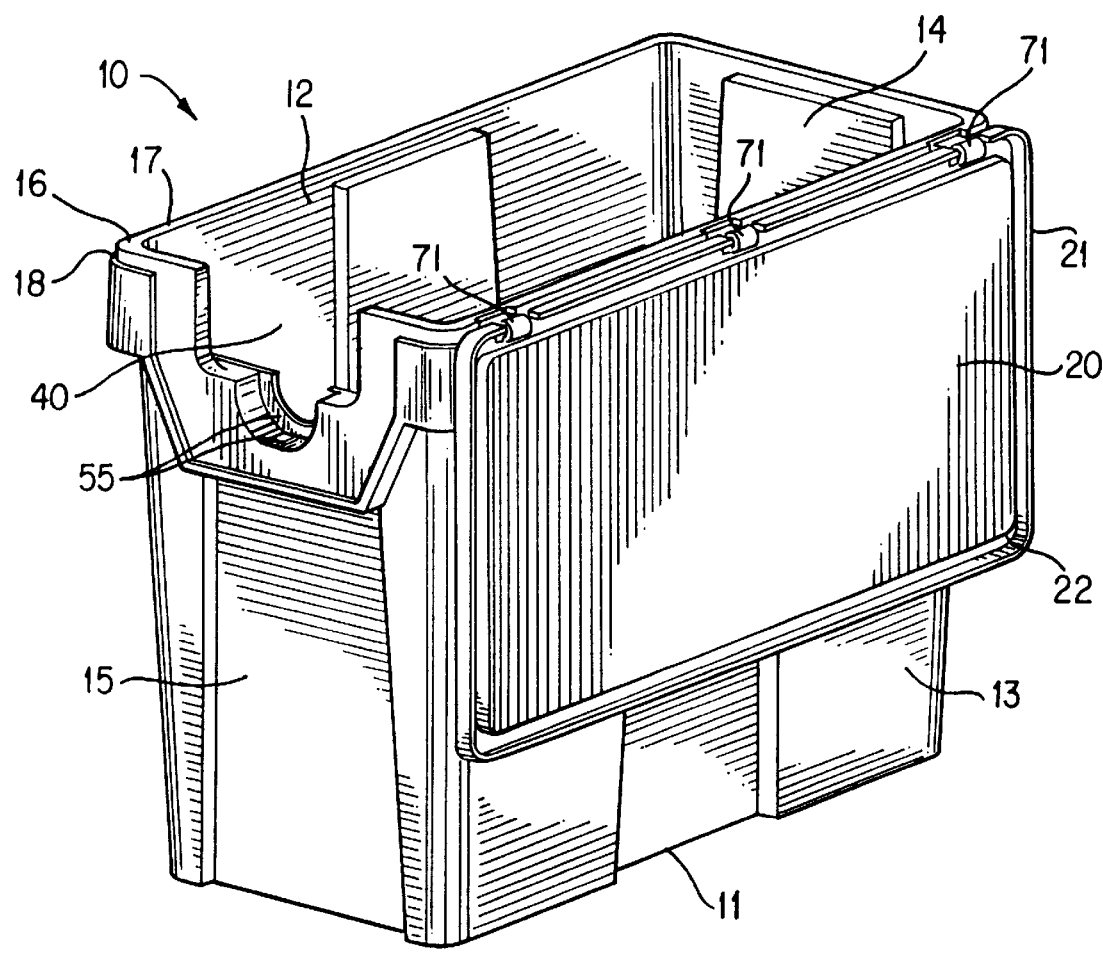
FIG. 4 is a differing perspective view of the container assembly of FIG. 1 showing the container lid in a fully open position.

Again, the side wall aperture 40 is preferably formed by a recess extending downwardly from the uppermost surface of the side wall 15 as shown most clearly in FIGS. 1 and 3–4. This configuration is preferred because the tamper-evident sealing means 60 is thus required only around at least a portion of the upper periphery of the container assembly 10. Hence, a unitary or one-piece sealing means 60 may be utilized.

The container lid 20 is connected to the first side wall 13 with a telescoping hinge means 70. As best shown in FIG. 3, the telescoping hinge means may comprise a plurality of container hinge elements 71 disposed in spaced relation along the uppermost surface of the first side wall 13. Each container hinge element 71 may comprise a pivot pin 72 slidably received within a respective hinge aperture 73 disposed in the first side wall 13. Because of its unique configuration, the telescoping hinge means 70 is capable of movement both parallel to and perpendicular to the first side wall 13 as shown by arrows A and B in FIG. 3. In this manner, when the hinge elements 71 telescope upwardly, the lid 20 may be rotated up and away from the upper container rim 16. Thus, the lid 20 is capable of being rotated around and juxtaposed with the first side wall 13 such that the lid 20 lies flat as shown in FIG. 4.

Figure 6:
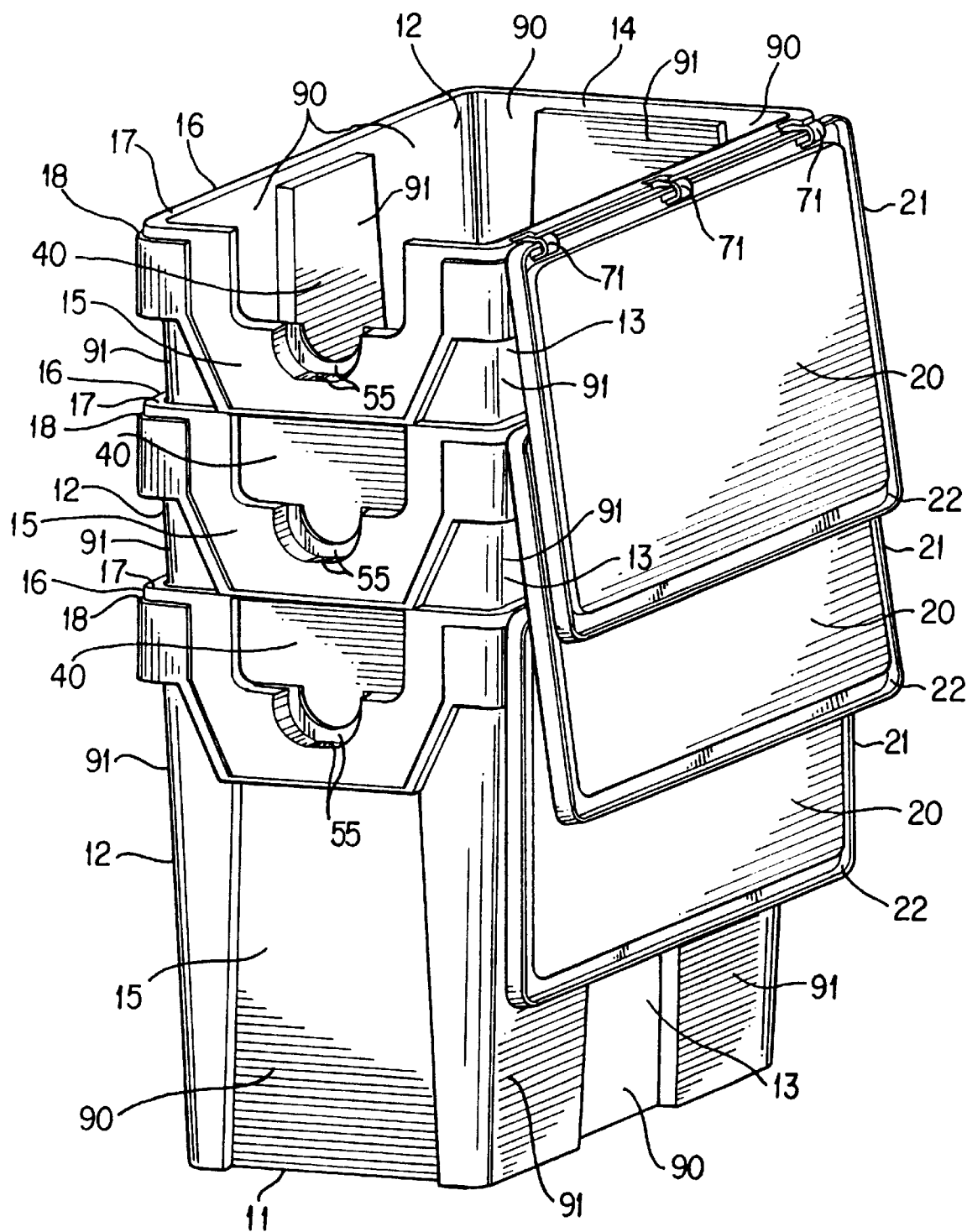
FIG. 6 is a perspective view of a nested configuration of several of the container assemblies shown in FIG. 1.

As shown in FIGS. 6 and 7, the container assembly 10 of the present invention is capable of both stacking and nesting with additional similarly shaped container assemblies when full or when empty. The bottom surface 11 of the container assembly includes an aperture 80. As shown in FIG. 7, this bottom surface aperture 80 is adapted to receive the raised surfaces 21 of the container lids 20 of a pair of similarly shaped juxtaposed container assemblies when the container assemblies are disposed in a stacked configuration. The container assembly 10 may be sized such that its bottom surface 11 extends fully across a pair of similarly shaped juxtaposed container assemblies stacked cross-wise therebelow. Thus, as shown in FIG. 7, the bottom surface 11 cooperates with the raised surfaces 21 around the outer periphery of the container assemblies stacked cross-wise therebelow. This configuration further stabilizes the stack of container assemblies. Further, while only a single container assembly 10 is shown in the upper position of the stack, the container assembly 10 may also be sized such that a pair of container assemblies will likewise cross-stack on a similarly-shaped pair disposed cross-wise therebelow.

In addition, as shown in FIG. 6, the interior and exterior surfaces of the first and second pairs of opposed side walls 12, 13, 14, 15 are formed with alternating recesses 90 and projections 91 configured and sized for reception by the recesses 90 of the projections 91 of a similarly shaped adjacent container assembly when the container assemblies are disposed in a nested configuration. Further, as discussed above, the telescoping hinge means 70 enables the lid 20 to rotate around and lie flat against the side wall 13 as shown in FIG. 4. This feature enables a plurality of the container assemblies 10 to be nested to a greater height than would ordinarily be possible in a given space as shown in FIG. 6.

FIGS. 8 through 14 illustrate a second embodiment of the container assembly 110 of the present invention. This second embodiment similarly utilizes a substantially rectangular open-top container having a bottom surface 111 and upstanding side walls 112, 113, 114, 115 as described above in accordance with the first embodiment. In this embodiment, however, a split-lid configuration is utilized.

More particularly, a first container lid 120a having an outer periphery is provided. The first container lid 120a is hingedly connected to a first side wall 112 of the first pair of opposed side walls. The first container lid 120a includes a projecting portion 125a extending along one side of its outer periphery. The first container lid 120a further includes a raised surface 121a extending about its outer periphery, with the raised surface 121a forming a hollow undersurface 122a about the outer periphery. The hollow undersurface 122a of the first container lid 120a is adapted to be received along a portion of the upper container rim 116 to thereby form a first exposed seam 130a between the first container lid 120a and the open-top container. In this regard, when the first container lid 120a is moved to a closed position as shown in FIG. 9, the hollow undersurface 122a is received along a portion of the upstanding surface 117 of the upper container rim 116 with the lowermost edge of the first container lid 120a resting on a portion of the thin shelf 118.

A second container lid 120b having an outer periphery is also provided in accordance with this second embodiment of the present invention. Like the first container lid 120a, the second container lid 120b is hingedly connected to a second side wall 113 of the first pair of opposed side walls. Also similarly, the second container lid 120b includes a projecting portion 125b extending along one side of its outer periphery. The second container lid 120b further includes a raised surface 121b extending about its outer periphery, with the raised surface 121b forming a hollow undersurface 122b about the outer periphery. Again, the hollow undersurface 122b of the second container lid 120b is adapted to be receiving along portion a portion of the upstanding surface 117 of the upper container rim 116 with the lowermost edge of the second container lid 120b resting on a portion of the thin shelf 118. The second container lid 120b is thereby snap-fit to the side walls 113, 114, 115 to thereby form a second exposed seam 130b between the second container lid 120b and the open-top container.

Figure 10:
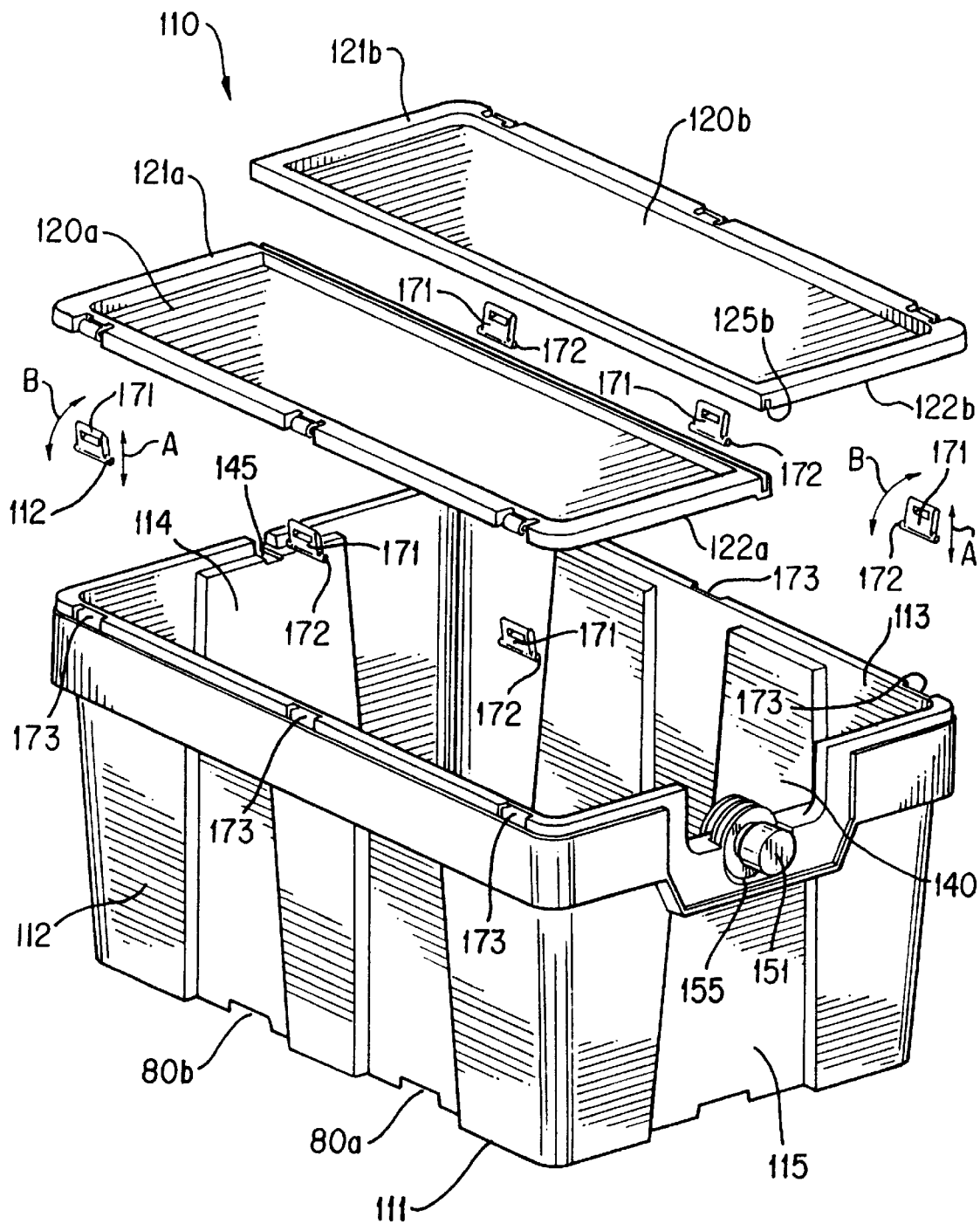
FIG. 10 is a partially exploded perspective view of the container assembly of FIG. 8.
Figure 11:
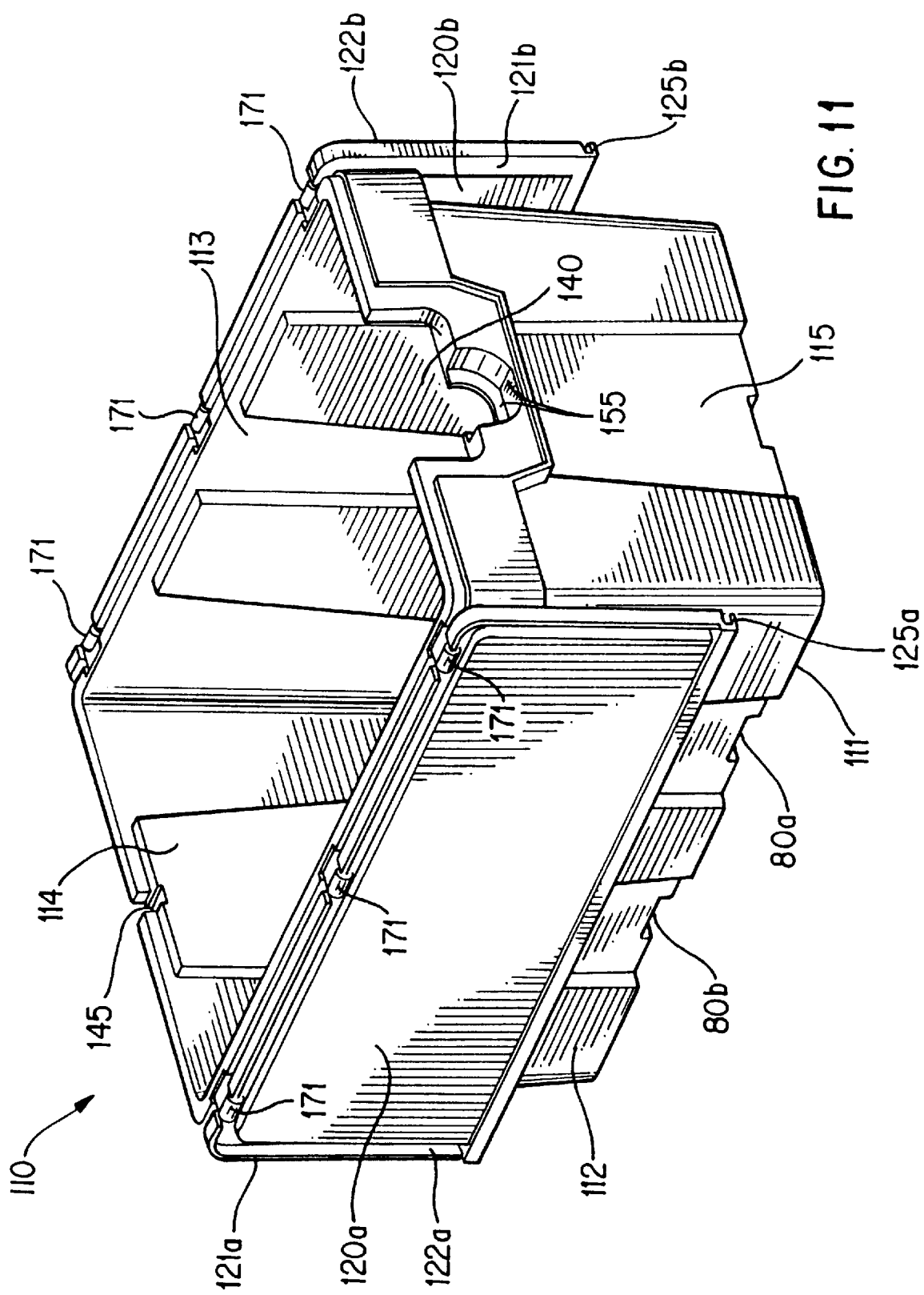
FIG. 11 is a differing perspective view of the container assembly of FIG. 8 showing the container lid in a fully open position.

The first and second container lids 120a, 120b are connected to first and second side walls 112, 113 with a telescoping hinge means 170, in accordance with the description above of the first embodiment of the present invention. This telescoping hinge means 170 may similarly comprise a plurality of container hinge elements 171 disposed in spaced relation along the uppermost surfaces of the first and second side walls 112, 113. Each container hinge element 171 may comprise a pivot pin 172 slidably received within a respective hinge aperture 173 disposed in the first and second side walls 112, 113. As shown in FIG. 10, the telescoping hinge means 170 is capable of movement both parallel to and perpendicular to the first and second side walls 112, 113 as shown by arrows A and B. Thus, when the hinge elements 171 telescope upwardly, the lids 120a and 120b may be rotated around and juxtaposed with the respective first or second side wall 112, 113 to lie flat as shown in FIG. 11.

Figure 9:
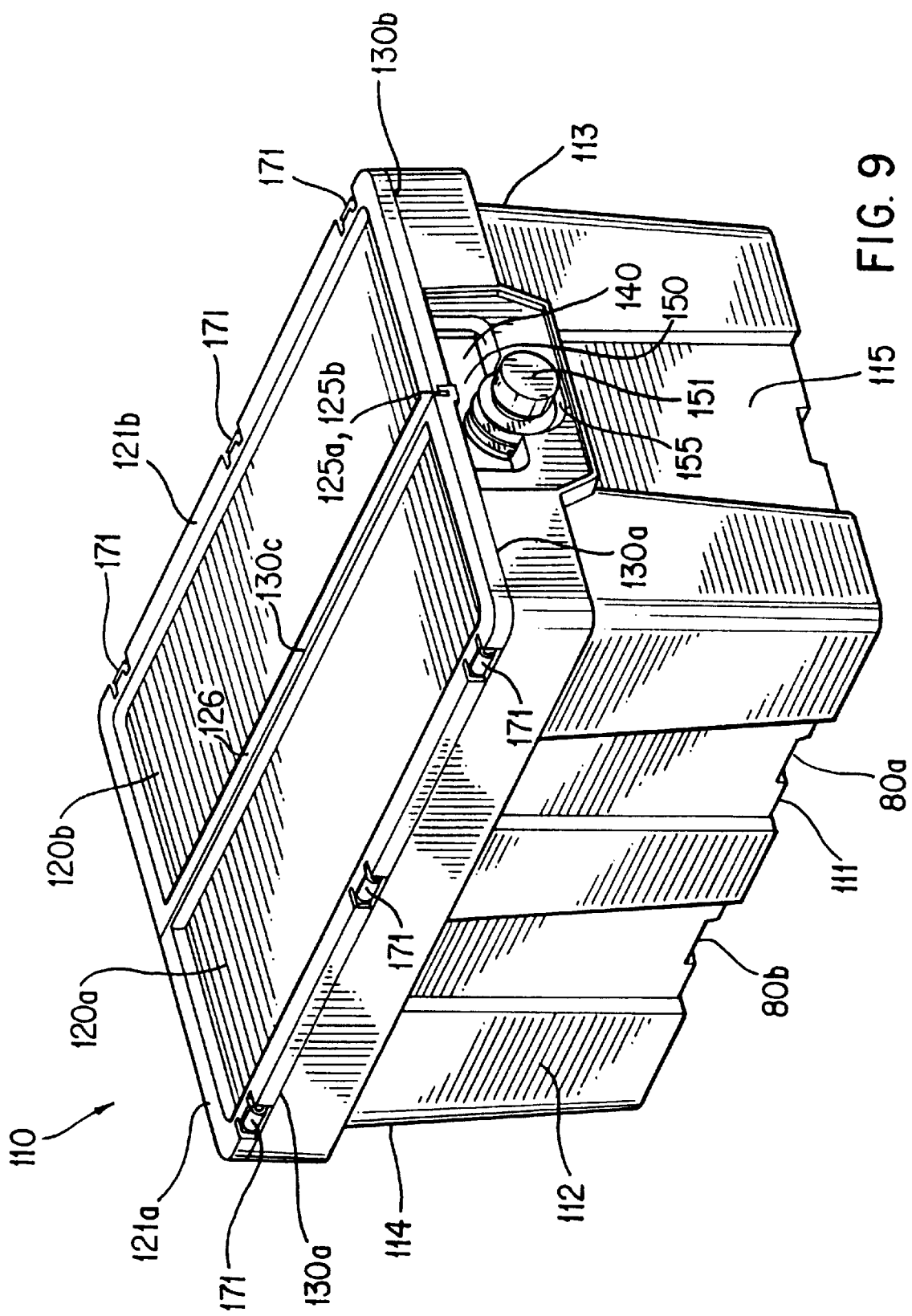
FIG. 9 is a perspective view of the container assembly of FIG. 8 shown in a closed condition.

The projecting portions 125a, 125b of the first and second container lids 120a, 120b are capable of being moved into an interlocking configuration with one another when the hollow undersurfaces 122a, 122b of the container lids 120a, 120b are received along the upper container rim 116, i.e., when the container lids 120a, 120b are moved into their closed positions as shown in FIG. 9. The interlocking projecting portions 125a, 125b thereby form a raised interlocking surface 126 and a third exposed seam 130c between the first and second container lids 120a, 120b.

Figure 8:
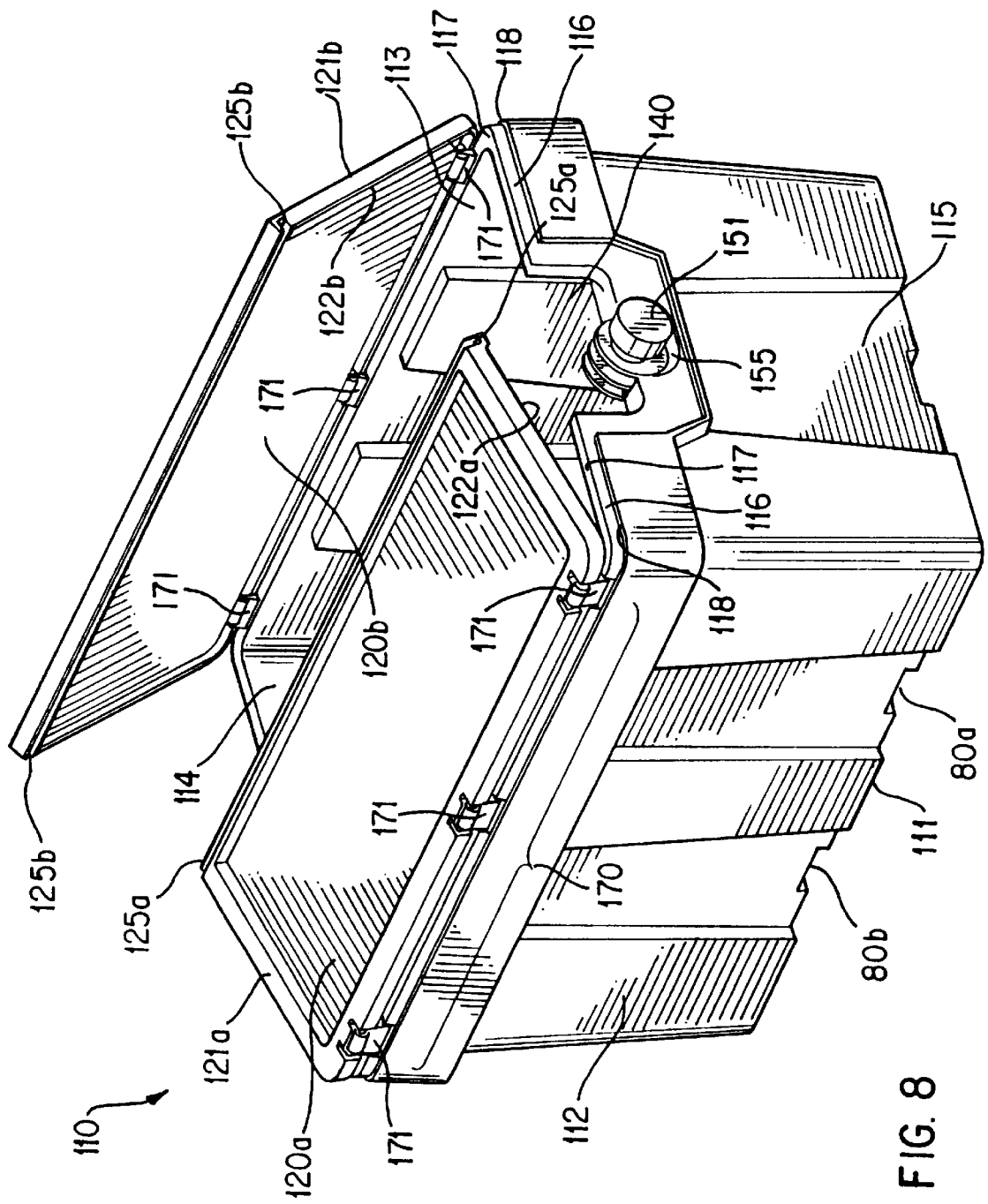
FIG. 8 is a perspective view of a second embodiment of the container assembly of the present invention in an open condition.

The second embodiment of the container system of the present invention also includes a side wall aperture 140 formed in the first side wall 115 of the second pair of opposed side walls. This side wall aperture 140 is formed substantially in accordance with the side wall aperture 40 discussed above with respect to the first embodiment. Thus, the side wall aperture 140 is preferably formed by a recess extending downwardly from the uppermost surface of the first side wall 115 as best shown in FIGS. 8 and 10–11. In this embodiment, however, the second side wall 114 of the second pair of opposed side walls also includes a recess 145 extending downwardly from the uppermost surface thereof. This recess 145 in the second side wall 114 is adapted to receive the projecting portions 125a, 125b of the first and second container lids 120a, 120b when the lids are in their closed positions.

As in the first embodiment, a tamper-evident sealing means 160 may be provided in this second embodiment. The tamper-evident sealing means 160 may extend across the side wall aperture 140 to thereby enclose the contents of the container system, e.g., a fluid-containing bag 150. The tamper-evident sealing means 160 may further extend along the third exposed seams 130c formed when the lids 120a, 120b are moved into their interlocking configuration. The tamper-evident sealing means 160 may also extend along the first and second exposed seams 130a, 130b formed when the hollow undersurfaces 122a, 122b of the container lids 120a, 120b are received along the upper container rim 116, i.e., when the lids 120a, 120b are moved into their closed positions.

Figure 12:
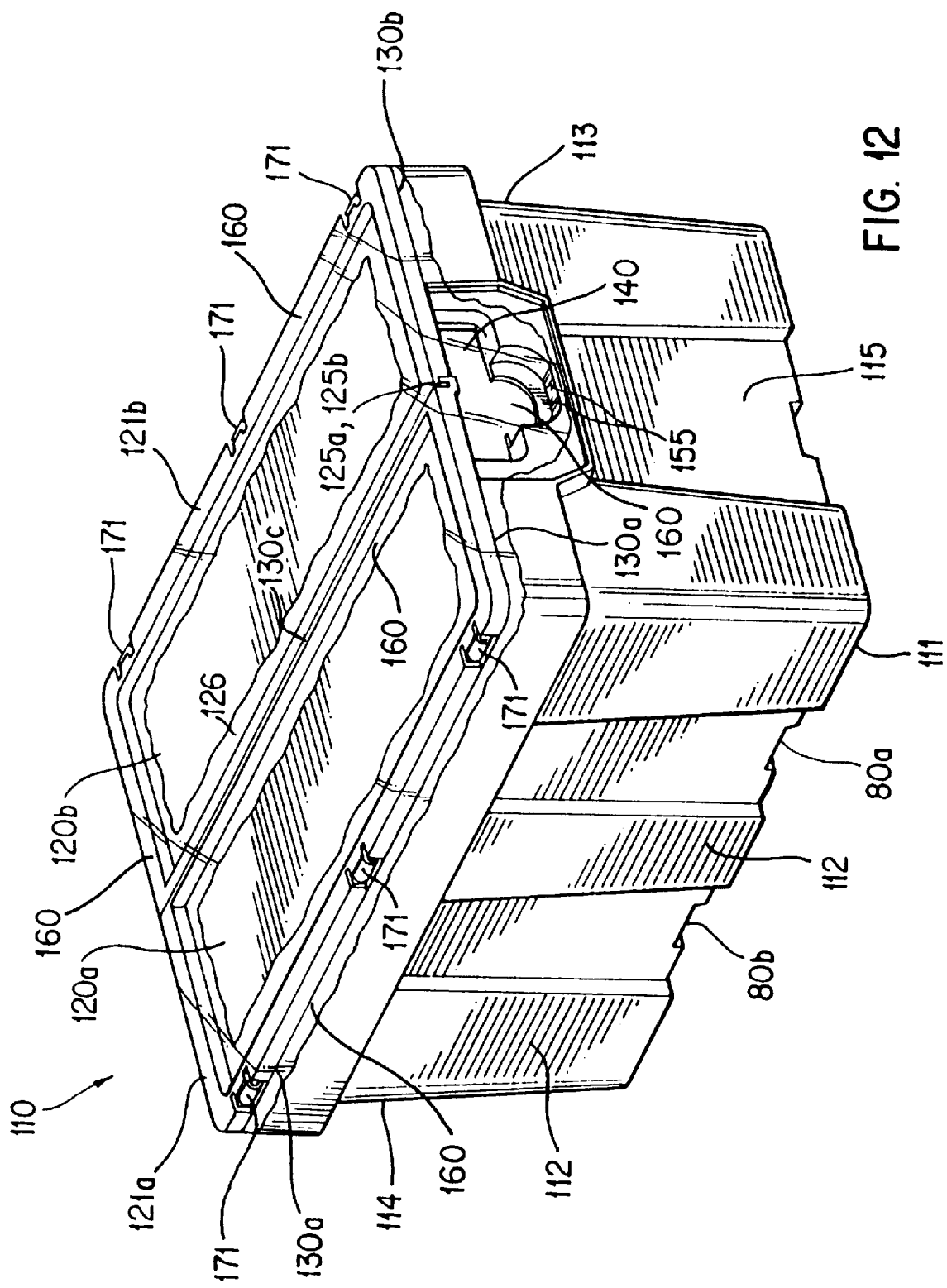
FIG. 12 is a perspective view of the container assembly of FIG. 8 shown in a closed condition and including a tamper-evident sealing means.

The tamper-evident sealing means 160 of this second embodiment differs somewhat because of the split-lid configuration. In this regard, the tamper-evident sealing means 160 may further extend along the third exposed seam 130c formed by the interlocking projecting portions 125a, 125b of the first and second container lids 120a, 120b. The second embodiment also differs in that the tamper-evident sealing means 160 may extend across the recess 145 formed in the second side wall. The tamper-evident sealing means 160 may thus effectively seal the entire container assembly 110 in a closed position. When the container assembly 110 later reaches its destination, if the tamper-evident sealing means 160 has been broken, this indicates to the user that the contents may have been tampered with or damaged. Again, the tamper-evident sealing means 160 may be any conventional type known to those having skill in the art, such as a shrink wrap film or adhesive-bearing material, and a label or sticker may be used to cover the side wall aperture 140. Also as above, while the sealing means 160 is illustrated in FIG. 12 as extending across the side wall apertures 140, 145 and fully along the exposed seams 130a, 130b, 130c, this configuration is not absolutely required. Rather, it is within the scope of the present invention to utilize the sealing means 160 only along those portions of the exposed seams 130a, 130b, 130c which are necessary to ensure that tampering with the container assembly 110 may be detected.

Figure 13:
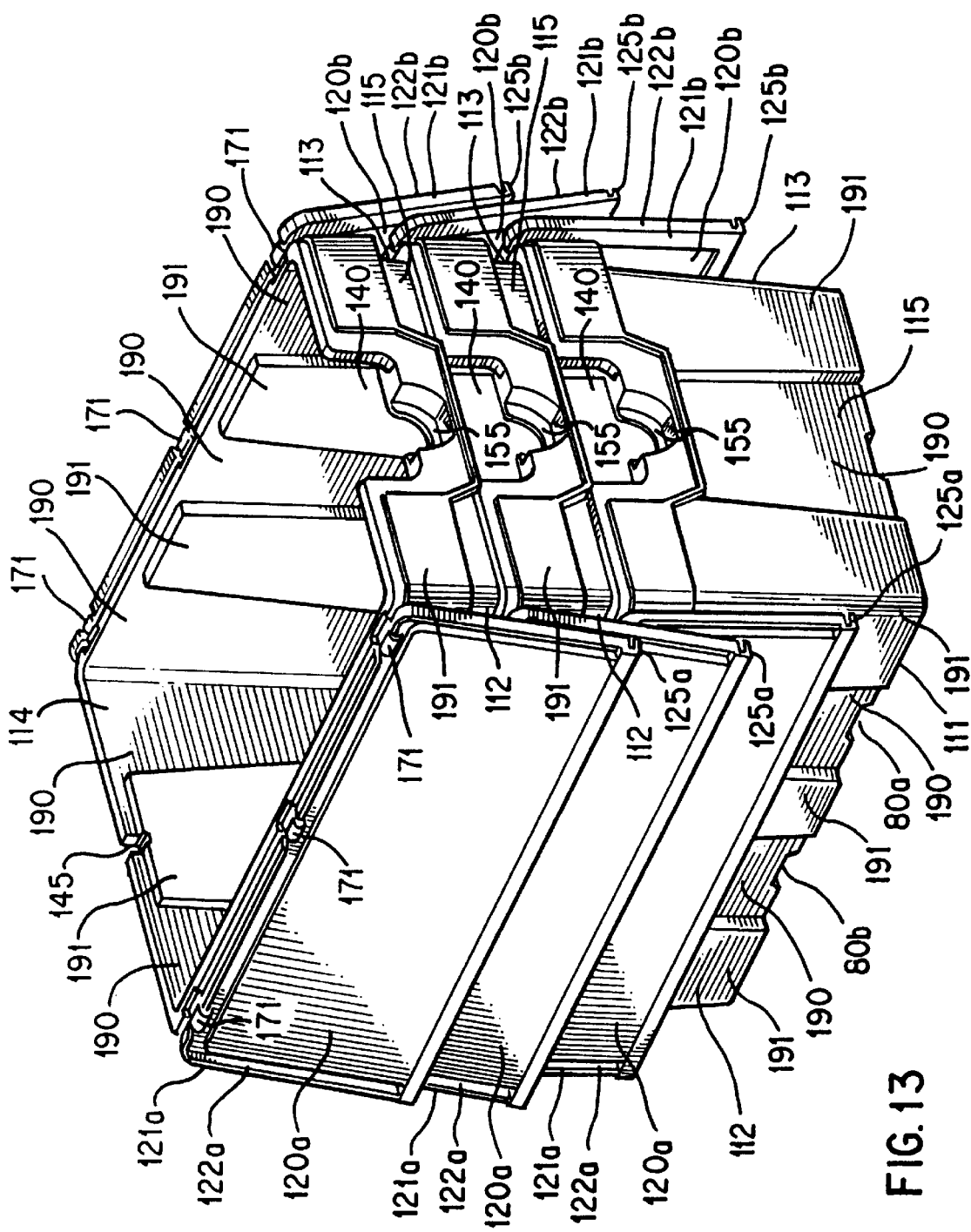
FIG. 13 is a perspective view of a nested configuration of several of the container assemblies shown in FIG. 8.
Figure 14:
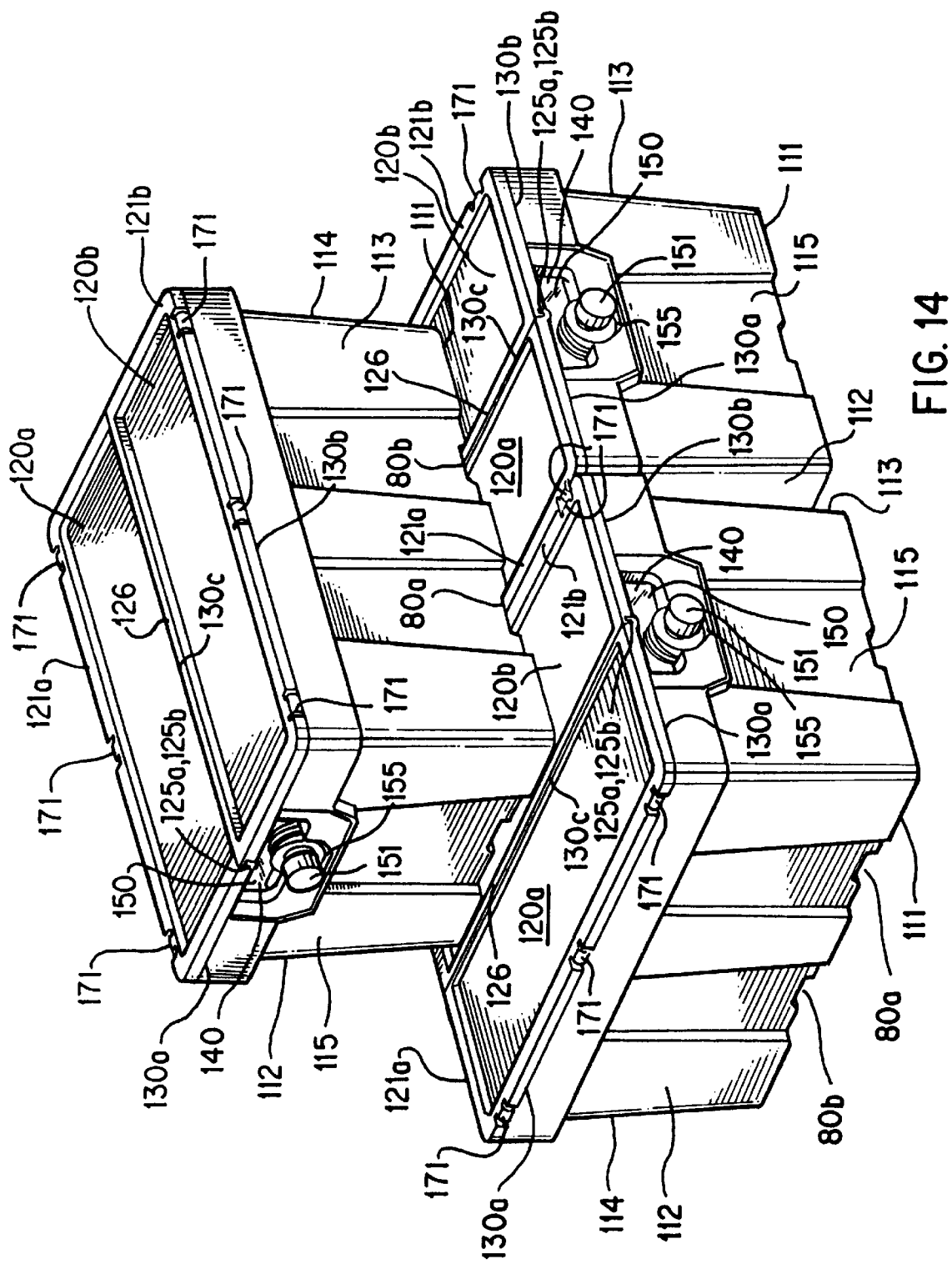
FIG. 14 is a perspective view of a stacked configuration of several of the container assemblies shown in FIG. 8.

Like the container assembly 10 of the first embodiment described above, this second embodiment of the container assembly 110 is also capable of stacking or nesting as shown in FIGS. 13 and 14. In this regard, the bottom surface 111 of the container assembly 110 is provided with a plurality of apertures. The bottom surface 111 includes at least first and second apertures 80a, 80b. These first and second bottom surface apertures 80a, 80b are adapted to receive the raised surfaces formed on the first and second container lids 120a, 120b of a pair of similarly shaped juxtaposed container assemblies 110 when the container assemblies are disposed in a stacked configuration. More particularly, as shown in FIG. 14, the first and second apertures 80a, 80b are designed to receive the peripheral raised surfaces 121a, 121b and the raised interlocking surfaces 126 formed along the top of a pair of adjacent container assemblies 110 stacked therebelow. The container assembly 10 may be sized such that its bottom surface 111 extends fully across a pair of similarly shaped juxtaposed container assemblies 110 stacked crosswise therebelow as shown in FIG. 14. Thus, the bottom surface 111 cooperates with the raised interlocking surfaces 126 and the raised surfaces 121a, 121b around the outer periphery of the container assemblies 110 stacked cross-wise therebelow. This configuration contributes to the stability of the container assemblies 110 when stacked.

Like the first embodiment, the container assembly 110 of the second embodiment of the present invention is also nestable. As shown in FIG. 13, the interior and exterior surfaces of the first and second pairs of opposed side walls 112, 113, 114, 115 are formed with alternating recesses 190 and projections 191 configured and sized for reception by the recesses 190 of the projections 191 of an adjacent similarly shaped container assembly 110 when the container assemblies 110 are disposed in a nested configuration.

As with the first embodiment described above, the container assembly 110 of the second embodiment is particularly adapted for use with a fluid-containing bag 150 with a spout 151 which may be disposed within the substantially rectangular open-top container. Again, the side wall aperture 140 may be formed in part by a recessed surface 155 of the first side wall 115 such that recessed surface 155 is configured to receive the spout 151 as shown in FIGS. 8–10 and 14. A user accesses the open-top container through the side wall aperture 140 to retrieve the spout 151 and secure it in position along the recessed surface 155.

Figure 15:
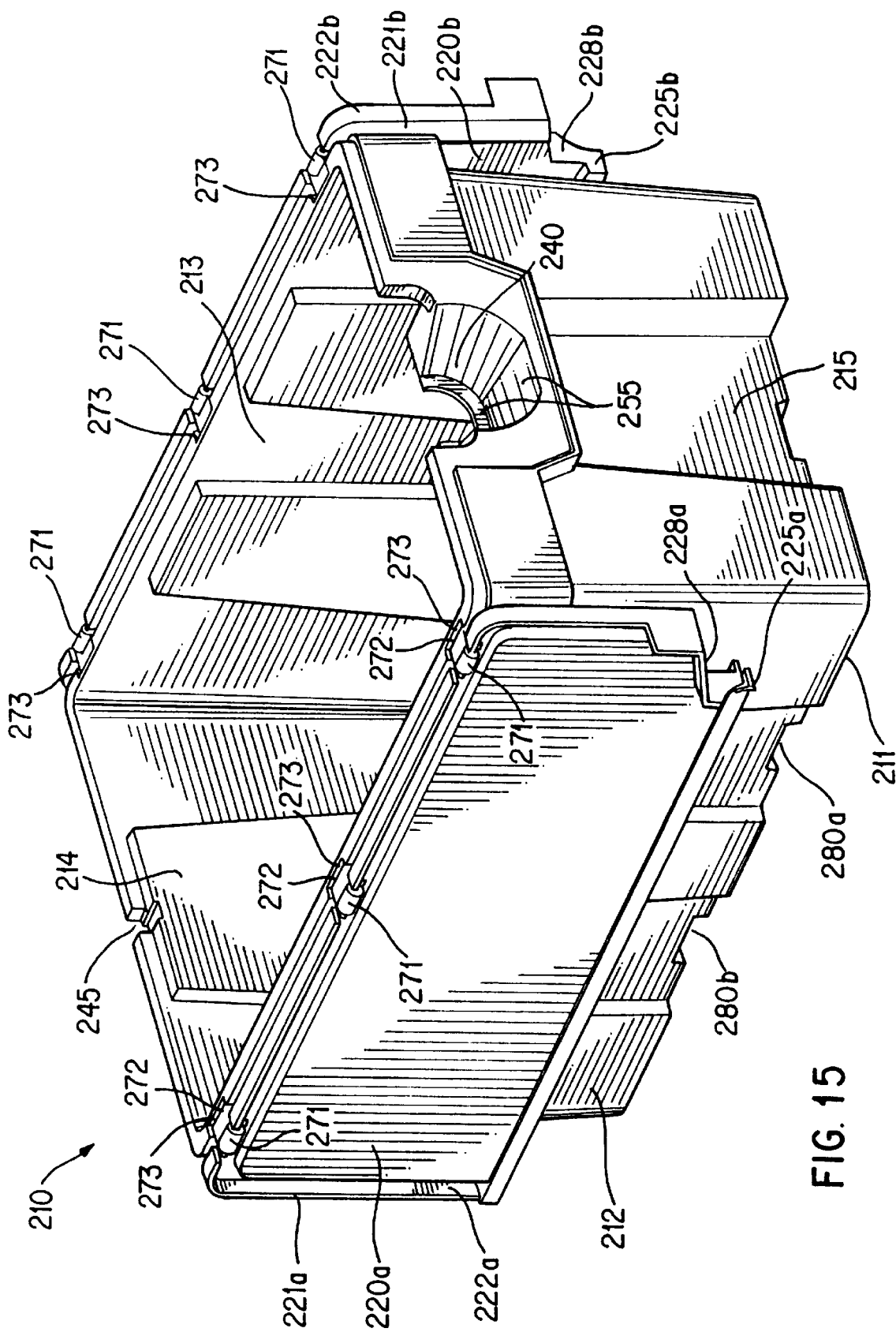
FIG. 15 is a perspective view of a third embodiment of the container assembly of the present invention in an open condition.
Figure 16:
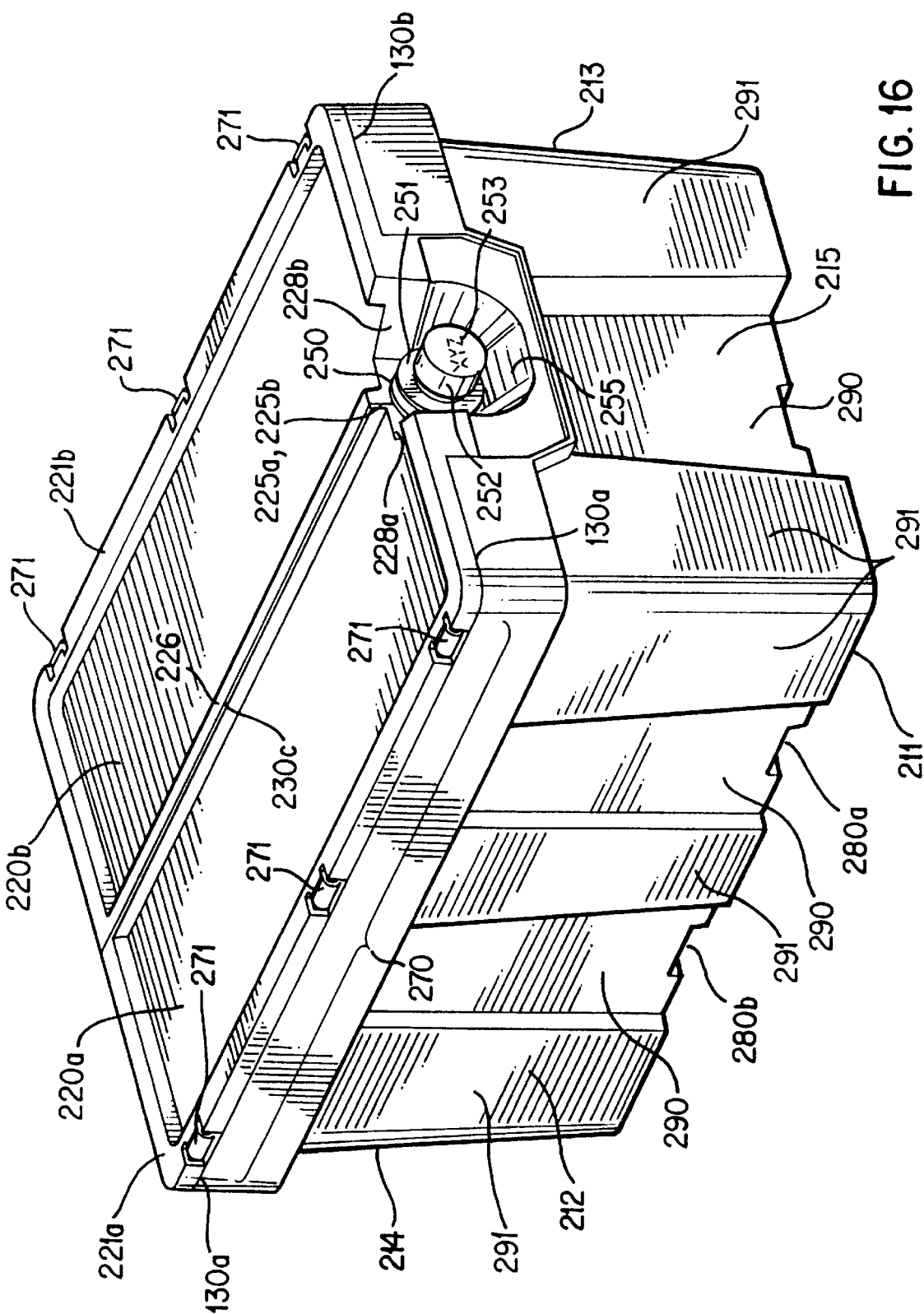
FIG. 16 is a perspective view of the container assembly of FIG. 15 shown in a closed condition.
Figure 17:
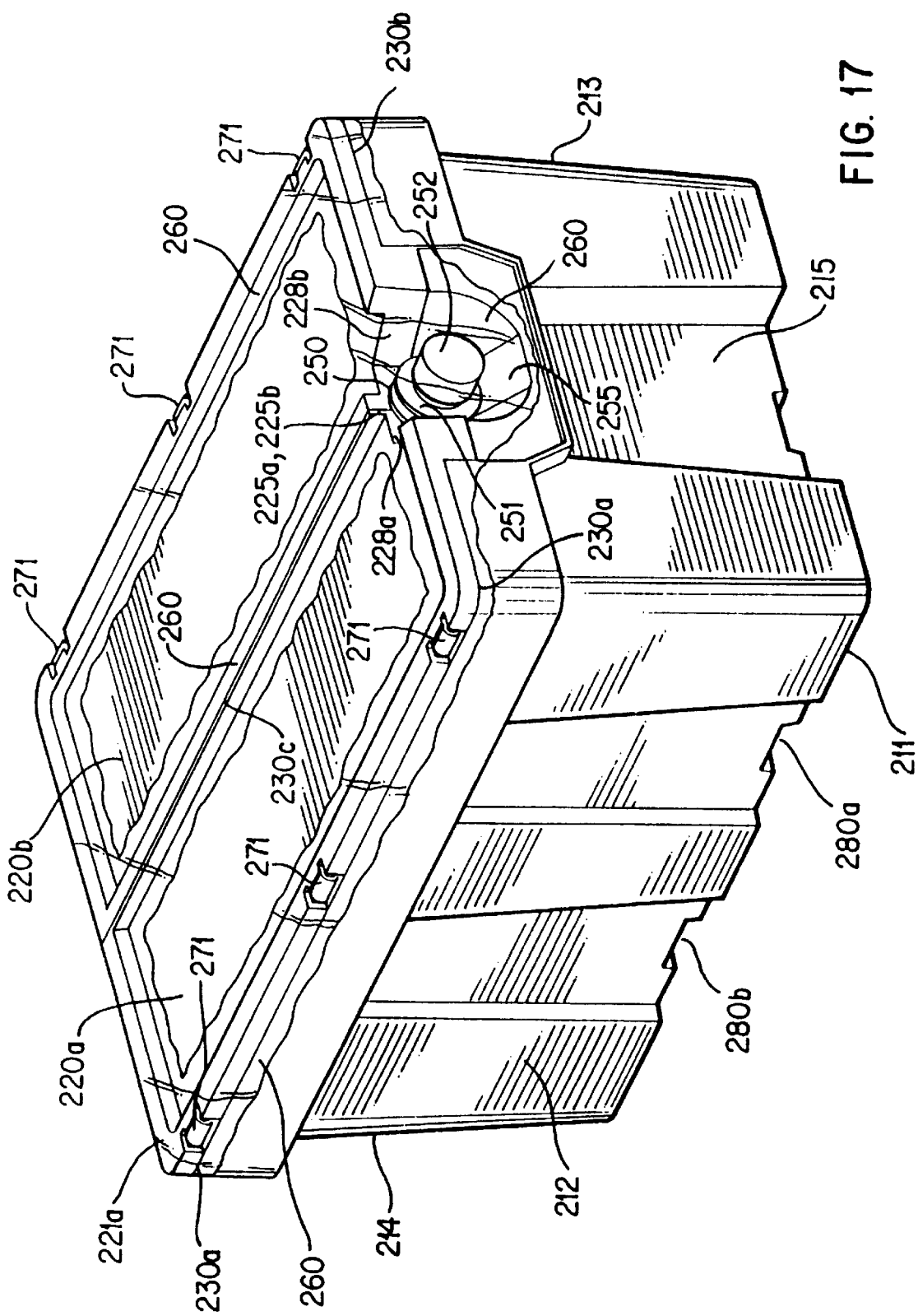
FIG. 17 is a perspective view of the container assembly of FIG. 15 shown in a closed condition and including an additional tamper-evident sealing means.

A third embodiment of the container assembly 210 of the present invention is shown in FIGS. 15–17. This embodiment similarly utilizes a substantially rectangular open-top container as described above in accordance with the first and second embodiments. However, this embodiment utilizes a modified split-lid configuration in cooperation with a recess of the cone 240 formed along one side of the container assembly. The container assembly 210 of this third embodiment is particularly adapted to effectively house a fluid-containing bag 250 with a spout 251.

In particular, a fluid-containing bag 250 with a spout 251 may be disposed within the substantially rectangular open-top container formed by a bottom surface 211 and first and second pairs of opposed side walls 212, 213, 214, 215. An aperture 240 is formed in a first side wall 215 of the second pair of opposed side walls. This side wall aperture 240 is formed by a recess extending downwardly from the uppermost surface of the first side wall 215. The side wall aperture 240 terminates in a recessed surface 255 of the first side wall 215, with the recessed surface 255 configured to receive the spout 251 from the bag 250. Also, a recess 245 is formed in the second side wall 214 of the second pair of opposed side walls to receive the projecting portions 225a, 225b of the first and second container lids 220a, 220b when the lids are in their closed positions, as described more fully below.

With this third embodiment, the spout 251 extends from the open-top container and through the side wall aperture 240 to be exposed from the container assembly 210 during storage and transport. The spout 251 may be sealed in any conventional manner such that it is tamper evident. In this regard, the spout 251 may be provided with a conventional cap 252 which is tamper evident. This cap 252 may also include informational indicia 253 regarding the particular contents of the container system.

As shown in FIG. 16, the recessed surface 255 of this embodiment is formed in a portion of the side wall 215 having a defined width or thickness. More specifically, the portion of the side wall 215 which includes the recessed surface 255 should have a width which is equal to or greater than the length of the spout 251 which protrudes from the open-top container through the side wall aperture 240. Stated differently, the side wall 215 and recessed surface 255 should have a depth which is sufficient to provide clearance for the spout 251 protruding from the open-top container. In this manner, the spout 251 is disposed fully within the side wall aperture 240 bordered by the recessed surface 255, the upstanding side wall 215, and the container lids 220a, 220b as shown in FIG. 16. When received along the recessed surface 255 of this thickened side wall 215, the spout 251 is protected from damage due to exterior forces, e.g., other container assemblies stacked adjacent thereto. Thus, the container assembly 210 may be shipped with the fluid-containing bag 250 in a ready-to-use condition without concern for damage to the spout 251.

The first and second container lids 220a, 220b of the third embodiment are provided substantially in accordance with the first and second container lids 120a, 120b described above with respect to the second embodiment. Specifically, the lids 220a, 220b are connected to the respective side walls 212, 213 via a telescoping hinge means 270. This telescoping hinge means 270 may comprise a plurality of container hinge elements 271 disposed in spaced relation along the uppermost surfaces of the first and second side walls 212, 213. Each container hinge element 271 may comprise a pivot pin 272 slidably received within a respective hinge aperture 273 disposed in the first and second side walls 212, 213. As shown in FIG. 15, when the hinge elements 271 telescope upwardly, the lids 220a and 220b may be rotated around and juxtaposed with the respective first or second side wall 212, 213 to lie flat.

The container lids 220a, 220b include raised surfaces 221a, 221b extending about their outer peripheries, and further include respective projecting portions 225a, 225b which provide for an interlocking configuration and the formation of a raised interlocking surface 226 and third exposed seam 230c. In addition, however, each of these first and second container lids 220a, 220b further includes a recessed area 228a, 228b about a portion of its respective outer periphery. These respective recessed areas 228a, 228b are configured to correspond to the side wall aperture 240 and provide clearance for the exposed spout 251.

The container assembly 210 is stackable and nestable as described above with respect to the second embodiment. The container assembly 210 thus includes a plurality of bottom surface apertures 280a, 280b to facilitate stacking, and a plurality of recesses 290 and projections 291 to facilitate nesting.

As discussed above, the spout 251 extends from the container and may be sealed in any conventional manner such that it is tamper evident. Additionally, or in the alternative, the container assembly may further comprise a separate tamper-evident sealing means 260, such as a shrink wrap film or adhesive-bearing material. As shown in FIG. 17, this tamper-evident sealing means 260 may extend across the side wall aperture 240 and the recessed areas 228a, 228b of the first and second container lids 220a, 220b to thereby cover the exposed spout. The tamper-evident sealing means 260 may also extend along the first and second exposed seams 230a, 230b when the lids 220a, 220b are in their respective closed positions. The tamper-evident sealing means 260 may further extend along the third exposed seam 230c, and across the recess 245 in the second side wall 214. Once again, while the sealing means 260 illustrated in FIG. 17 extends across the side wall apertures 240, 245 and fully along the exposed seams 230a, 230b, 230c, this configuration is not absolutely required. Rather, it is within the scope of the present invention to utilize the sealing means 260 only along those portions of the exposed seams 230a, 230b, 230c which are necessary to ensure that tampering with the container assembly 210 may be detected.

The first and second embodiments of the container assembly 10, 110 of the present invention are designed for transport and storage with a fluid-containing bag 50, 150 disposed entirely within the open-top container. With the third embodiment, however, the container assembly 210 may be stored and transported with a fluid-containing bag 250 in a ready-to-use condition. Specifically, because of its unique configuration, the container assembly 210 may be shipped with the spout 251 in its operative position. The spout 251 is received along the side wall 215 of the container assembly in the side wall aperture 240. The side wall aperture 240 terminates in a recessed surface of the first side wall 255, with the recessed surface 255 configured to receive the spout 251 from the bag 250. With the container lids 220a, 220b in their closed positions, the spout 251 is held in its operative position by the recessed surface 255 of the side wall 215 and the lids 220a, 220b. The recessed areas 228a, 228b of the lids 220a, 220b provide clearance for the exposed spout 251 along the side wall 215. It is envisioned that the apparatus used to fill the fluid-containing bag 250 may also be used to secure the spout 251 in its place along the side wall 215 when the container assembly 250 is readied for transport.

Because the container assembly 210 of this third embodiment may be shipped with the fluid-containing bag 250 in a ready-to-use condition, handling by the end user is desirably reduced. When the container assembly 210 reaches its final destination, the user simply accesses the spout 251 by removing the conventional tamper-evident cap 252 and/or breaking the conventional tamper-evident sealing means 260. The user need not retrieve the spout 251 from within the open-top container or secure it in place as required with prior art container assemblies.

In addition, this configuration of the present invention is more easily made tamper-evident. As shown in FIG. 16, the side wall aperture 240 is made only large enough to receive the spout 251. Thus, the contents of the container assembly 210 are completely enclosed within the open-top container when the lids 220a, 220b are moved into their closed positions. Accordingly, all that needs to be protected from tampering or damage during transport is the exposed spout 251. This may be accomplished using any known conventional means, such as a tamper-evident cap 252. Also, as shown in FIG. 17, the use, if desired, of a separate tamper-evident sealing means 260 is facilitated. Because the side wall aperture 240 of this embodiment need only be large enough to receive the spout 251, additional aperture space which is required with other designs to facilitate user access, need not be covered with the tamper-evident sealing means 260.

While the description herein pertains to preferred embodiments of the invention, it should be understood that various changes in the details, materials and arrangement of elements which have been described and illustrated in order to explain the nature of the invention, may be made by those skilled in the art within the principle and scope of the invention as expressed in the appended claims.

What is claimed is:

1. A container assembly comprising:
   a bottom surface;
   a first pair of opposed side walls integrally joined with said bottom surface and extending upwardly away therefrom, a second pair of opposed side walls integrally joined with said bottom surface and extending upwardly away therefrom, said first and second pairs of opposed side walls being integrally joined with each other along common end surfaces thereof to form with said bottom surface a substantially rectangular open-top container, the uppermost surfaces of said first and second pairs of opposed side walls collectively forming an upper container rim;
   a fluid-containing bag disposed within said substantially rectangular open-top container, said fluid-containing bag including a spout;
   a side wall aperture to matingly engage and support said spout in locked relation, said aperture formed in a first side wall of said second pair of opposed side walls, said side wall aperture terminating in a recessed surface of said first side wall, said recessed surface configured to receive and support said spout; and
   a lid means.

2. The container assembly of claim 1 further comprising a tamper-evident sealing means.

3. The container assembly of claim 2 wherein said tamper-evident sealing means comprises a seal on said spout such that said spout is tamper-evident.

4. The container assembly of claim 1 wherein said lid means comprises first and second container lids having respective outer peripheries, said first container lid hingedly connected to a first side wall of said first pair of opposed side walls, said first container lid including a recessed area about a portion of its outer periphery, said recessed area of said first container lid configured to correspond to said side wall aperture,
   said second container lid hingedly connected to a second side wall of said first pair of opposed side walls, said second container lid including a recessed area about a portion of its outer periphery, said recessed area of said second container lid configured to correspond to said side wall aperture.

5. The container assembly of claim 4 wherein said first container lid includes a projecting portion extending along one side of said outer periphery, said first container lid further including a raised surface extending about said outer periphery, said raised surface forming a hollow undersurface about said outer periphery of said first container lid, said hollow undersurface of said first container lid adapted to be received along a portion of said upper container rim to thereby form a first exposed seam between said first container lid and said open-top container, and
   wherein said second container lid includes a projecting portion extending along one side of said outer periphery, said second container lid further including a raised surface extending about said outer periphery, said raised surface forming a hollow undersurface about said outer periphery of said second container lid, said hollow undersurface of said second container lid adapted to be received along a portion of said upper container rim to thereby form a second exposed seam between said second container lid and said open-top container.

6. The container assembly of claim 5 wherein said projecting portions of said first and second container lids are capable of being moved into an interlocking configuration with one another when said hollow undersurfaces of said container lids are received along said upper container rim, the interlocking configuration of said projecting portions thereby forming a raised interlocking surface and a third exposed seam between said first and second container lids.

7. The container assembly of claim 6 wherein a second side wall of said first pair of opposed side walls includes a recess extending downwardly from the uppermost surface thereof, said recess in said second side wall adapted to receive said projecting portions of said first and second container lids when said hollow undersurfaces of said first and second container lids are received along said upper container rim.

8. The container assembly of claim 7 further comprising a tamper-evident sealing means, wherein said tamper-evident sealing means extends across said side wall aperture and said recessed areas of said first and second container lids to thereby cover said spout.

9. The container assembly of claim 8 wherein said tamper-evident sealing means further extends along at least a portion of said third exposed seam when said container lids are moved into said interlocking configuration.

10. The container assembly of claim 9 wherein said tamper-evident sealing means further extends along at least a portion of said first and second exposed seams when said hollow undersurfaces of said container lids are received along said upper container rim.

11. The container assembly of claim 10 wherein said tamper-evident sealing means comprises a shrink wrap film.

12. The container assembly of claim 10 wherein said tamper-evident sealing means comprises an adhesive-bearing material.

13. The container assembly of claim 4 wherein said first and second container lids are connected to said respective first or second side wall of said first pair of opposed side walls with a telescoping hinge means.

14. The container assembly of claim 13 wherein each of said telescoping hinge means is capable of movement both parallel to and perpendicular to said respective first or second of said first pair of opposed side walls.

15. The container assembly of claim 13 wherein each of said telescoping hinge means comprises a plurality of container hinge elements disposed in spaced relation along the uppermost surface of said respective first or second side wall of said first pair of opposed side walls.

16. The container assembly of claim 15 wherein each of said plurality of container hinge elements comprises a pivot pin slidably received within a respective hinge aperture disposed in said respective first or second side wall of said first pair of opposed side walls.

17. The container assembly of claim 14 wherein said first and second container lids are capable of being juxtaposed with said respective first or second side wall of said first pair of opposed side walls.

18. The container assembly of claim 5 wherein said bottom surface of said container assembly includes first and second apertures, said first and second bottom surface apertures adapted to receive the raised surfaces of the first and second container lids of a pair of similarly shaped juxtaposed container assemblies when said container assemblies are disposed in a stacked configuration.

19. The container assembly of claim 1 wherein said interior and exterior surfaces of said first and second pairs of opposed side walls are formed with alternating recesses and projections configured and sized for reception by said recesses of the projections of an adjacent similarly shaped container assembly when said container assemblies are disposed in a nested configuration.

20. The container assembly of claim 11 wherein said side wall aperture is formed by a recess extending downwardly from the uppermost surface of said first side wall of said second pair of opposed side walls.

* * * * *